United States Patent [19]
Long

[11] Patent Number: 6,142,141
[45] Date of Patent: Nov. 7, 2000

[54] AIRFLOW DIFFUSER FOR USE WITH A FORCED-AIR SPACE HEATER AND A FORCED-AIR SPACE HEATER USING THE SAME

[75] Inventor: Norris R. Long, Wichita, Kans.

[73] Assignee: The Coleman Company, Inc.

[21] Appl. No.: 08/841,786

[22] Filed: May 5, 1997

[51] Int. Cl.$^7$ ................................................ F24H 3/02
[52] U.S. Cl. ............................... 126/110 B; 126/110 C; 432/222
[58] Field of Search ..................... 432/222, 223, 432/224; 126/110 B, 110 C; 431/183, 182, 187, 185, 9, 265

[56] References Cited

U.S. PATENT DOCUMENTS

| | | | |
|---|---|---|---|
| D. 264,374 | 5/1982 | Briggs et al. | D23/123 |
| D. 330,756 | 11/1992 | Davies, III et al. | D23/335 |
| 3,101,193 | 8/1963 | Varvel | 263/19 |
| 3,129,748 | 4/1964 | Varvel | 158/76 |
| 3,256,003 | 6/1966 | Briggs | 263/19 |
| 3,298,418 | 1/1967 | Briggs | 158/76 |
| 3,494,599 | 2/1970 | Stupak, Jr. et al. | 263/19 |
| 3,645,512 | 2/1972 | Dent et al. | 263/19 A |
| 3,666,396 | 5/1972 | Briggs et al. | 431/264 |
| 3,706,446 | 12/1972 | Briggs | 263/19 A |
| 3,720,496 | 3/1973 | Briggs | 431/353 |
| 3,829,281 | 8/1974 | Briggs et al. | 423/63 |
| 4,081,238 | 3/1978 | Briggs et al. | 432/222 |
| 4,089,642 | 5/1978 | Briggs et al. | 432/222 |
| 4,201,544 | 5/1980 | Briggs et al. | 432/222 |
| 4,244,349 | 1/1981 | Velie et al. | 126/110 C |
| 4,309,978 | 1/1982 | Hensiek et al. | 26/110 B |
| 4,313,417 | 2/1982 | Briggs et al. | 126/110 B |
| 4,327,704 | 5/1982 | Fredrickson | 126/59.5 |
| 4,340,362 | 7/1982 | Chalupsky et al. | 432/222 |
| 4,390,004 | 6/1983 | Kardos et al. | 126/104 A |
| 4,443,187 | 4/1984 | Shaftner et al. | 432/222 |
| 4,532,914 | 8/1985 | Thomas et al. | 126/110 C |
| 4,651,711 | 3/1987 | Velie | 126/110 C |
| 4,691,688 | 9/1987 | Urso | 126/208 |
| 4,729,365 | 3/1988 | Mutchler | 126/110 B |
| 4,762,488 | 8/1988 | Schilling | 431/350 |
| 4,774,931 | 10/1988 | Urso | 126/85 B |
| 4,848,313 | 7/1989 | Velie | 126/110 C |
| 4,850,853 | 7/1989 | Gruber et al. | 431/90 |
| 4,958,619 | 9/1990 | Kardas | 126/85 R |
| 5,017,129 | 5/1991 | Velie | 431/326 |
| 5,052,367 | 10/1991 | Beavers et al. | 126/110 B |
| 5,108,284 | 4/1992 | Gruswitz | 431/286 |
| 5,137,445 | 8/1992 | Chu | 431/326 |
| 5,201,651 | 4/1993 | Niksic et al. | 431/12 |
| 5,249,956 | 10/1993 | Chu | 431/326 |
| 5,307,800 | 5/1994 | Lee, Jr. | 126/110 B |
| 5,336,084 | 8/1994 | Long | 431/354 |
| 5,417,565 | 5/1995 | Long | 431/231 |
| 5,533,892 | 7/1996 | Long | 431/264 |
| 5,540,213 | 7/1996 | Shell et al. | 126/110 B |
| 5,848,585 | 12/1998 | Long et al. | 431/183 |

*Primary Examiner*—Denise L. Ferensic
*Assistant Examiner*—Jiping Lu
*Attorney, Agent, or Firm*—Kramer, Levin, Naftalis & Frankel LLP

[57] ABSTRACT

A unitary airflow diffuser for use with a forced-air space heater has a plurality of spurs radially extending from a hub. The spurs include one or more vanes for deflecting the airflow generated by fan blades within the space heater. A nozzle assembly is secured through an aperture in the hub of the diffuser for supplying fuel within a combustion chamber. Brackets can be provided for securing an igniter and a sensor to the airflow diffuser. Mounting tabs are provided on each vane to secure the airflow diffuser to a mounting plate disposed at the input of the combustion chamber. The nozzle ejects the fuel through a central aperture in the mounting plate into the combustion chamber. The mounting plate can have secondary apertures through which air can be diverted, and vanes can be provided on the mounting plates to direct air through the secondary apertures. The deflected air ensures that the fuel swirls around the nozzle and igniter and also serves as auxiliary combustion air with the result that a uniform, clean burning flame is realized.

35 Claims, 18 Drawing Sheets

AIRFLOW DIFFUSER FOR USE WITH A FORCED-AIR SPACE HEATER AND A FORCED-AIR SPACE HEATER USING THE SAME

BACKGROUND OF THE INVENTION

1. Field of the Invention

The present invention pertains to a device for controlling the flow of intake air in a space heater. More specifically, the present invention pertains to a unitary airflow diffuser disposed at an input port of a combustion chamber of a portable, forced-air, space heater.

2. Related Background Art

Both gas fired (for example propane, butane and the like) and oil fired (for example fuel oil, kerosene, gasoline, and the like) portable, forced-air, space heaters are well known for use in otherwise unheated areas, such as construction sites, farm buildings, garages, work sheds, and outdoor recreation areas. U.S. Pat. No. 3,101,193 discloses one such oil fired portable space heater. Generally, oil fired space heaters include at least a fuel tank, a combustion chamber, a motor for driving a compressor and a fan, a nozzle assembly, and an igniter. Air supplied by the compressor is delivered to a chamber in the nozzle assembly. The compressed air in the chamber creates suction on the fuel line, which runs from the chamber to the fuel tank. The suction draws fuel from the fuel tank into the chamber and entrains, atomizes, and vaporizes the fuel with the compressed air. The nozzle assembly delivers the entrained, atomized, and vaporized fuel through a small borehole in a nozzle into one end, i.e., the input port, of the combustion chamber in the vicinity of the igniter, which may be a spark plug. The fan provides secondary combustion air and also serves to discharge the heated air through an opposite end, i.e., the discharge port, of the combustion chamber.

Efforts have been made to increase the efficiency, safety, and performance of space heaters by controlling the air-fuel mixture and otherwise affecting the combustion of the fuel within the combustion chamber. However, such efforts oftentimes are costly to implement making them commercially unacceptable.

One known approach for improving the efficiency, safety, and performance of space heaters is to control the airflow from the fan, which is directed toward, into, and within the combustion chamber. The objectives of this approach are to achieve more complete combustion, increase efficiency, and avoid the impingement of any unburned fuel and the flame on the interior surfaces of the heater. U.S. Pat. No. 3,129,748 discloses a multicomponent burner assembly for use in a space heater. The burner assembly comprises a burner body capped at its operating face by an annular control plate. A plurality of recesses in the burner body and a series of guides or deflector blades mounted on the inner face of the control plate are provided to control the airflow within the space heater to affect fuel ignition and combustion.

U.S. Pat. No. 3,706,446 provides another example of a multicomponent burner assembly including a burner head and a flame retention head. Further, U.S. Pat. No. 4,201,544 discusses a burner head with a plurality of curved fingers for deflecting air. The burner head shown in the '544 patent is discussed in more detail in U.S. Pat. No. 3,298,148.

One disadvantage of arrangements which employ one-piece burner heads, such as those shown in the foregoing patents, is that the burner head is generally fabricated using casting methods. See for example, U.S. Pat. No. 3,494,599. Casting results in increased manufacturing costs and production time.

Another arrangement for controlling airflow at the input of and within the combustion chamber is to provide a plate with a plurality of separate fins or vanes projecting therefrom at the input port of the combustion chamber. U.S. Pat. Nos. 4,532,914 and 4,081,238 are illustrative of such arrangements, in propane and kerosene fired forced-air space heaters, respectively. Although these arrangements avoid the need for a cast burner head, they suffer the disadvantage that the plate and the fins and vanes must be separately and individually fabricated. An additional disadvantage is that the fins and vanes must be separately and individually secured to the plate by means of rivets or the like. Such disadvantages increase manufacturing costs and production assembly time.

Gas, such as propane fired forced-air space heaters also are known. These heaters generally are simpler in certain aspects than oil fired space heaters as will be discussed below. Nevertheless, there is a need to combine the airflow into and through the combustion chamber of propane forced-air space heaters to optimize combustion.

Therefore, there is a need in the art for mechanisms that produce the desired airflow characteristics in the combustion chamber, which can be formed without resort to casting or other expensive manufacturing techniques, and that are suitable for use in oil and gas fired forced-air space heaters.

There is a further need in the art for such a mechanism for producing desired airflow characteristics, which is formed as a unitary piece, further reducing manufacturing costs of production assembly time of forced-air space heaters.

SUMMARY OF THE INVENTION

An object of the invention is to provide an oil or gas fired portable, forced-air space heater that safely and efficiently burns the fuel with reduced levels of carbon monoxide and unburned hydrocarbons.

Another object of the invention is to provide a portable, forced-air space heater that includes means, which is simple and economical to fabricate, for controlling secondary combustion airflow.

A further object of the invention is to provide an airflow diffuser that is simple and economical to fabricate for use at an input port of a combustion chamber in a portable, forced-air space heater.

Yet another object of the invention is to provide a unitary airflow diffuser adapted to be secured to a mounting plate at an input port of a combustion chamber in a portable, forced-air space heater, which includes a plurality of air deflector vanes extending from radially extending spurs and includes provisions for mounting a nozzle assembly, an igniter, and a flame sensor.

A still further object of the invention is to provide any airflow diffuser, for use at an input port of a combustion chamber in a portable, forced-air space heater, that ensures that entrained, atomized, and vaporized fuel delivered into and through the combustion chamber is optimally combusted, minimizes the production of toxic fumes, and reduces the likelihood of impingement of the unburned fueled particles and the flame on interior surfaces of the combustion chamber.

Accordingly, the invention in one aspect pertains to a unitary airflow diffuser for use with a combustion chamber in a forced-air space heater, including a hub having an aperture for receiving a nozzle and a plurality of spurs. The spurs radially extend from the hub, and each of the spurs includes a tapered faceplate and a primary vane extending from an edge of the faceplate so as to form a closed angle with a side of the faceplate. A mounting tab extends from each of a plurality of the primary vanes, each of the mounting tabs being substantially parallel to the hub for securing the airflow diffuser to an input side of the combustion chamber.

The invention in another aspect pertains to a forced-air space heater including a housing and a combustion chamber disposed within the housing, the combustion chamber having an input port and a discharge port. A mounting plate is disposed at the input port, and a unitary airflow diffuser is secured to the mounting plate. The airflow diffuser has a hub, with a central aperture, and a plurality of spurs radially extending from the hub. Each of the spurs includes a tapered faceplate and a primary vane extending from an edge of the faceplate so as to form a closed angle with a side of the faceplate. Means is provided for delivering a supply of fuel through the central aperture into the combustion chamber, as is means for drawing ambient air into the housing and directing the air toward and through the airflow diffuser, and means for igniting the fuel in the combustion chamber.

The invention in yet another aspect pertains to an airflow diffuser assembly including a mounting plate having a primary central aperture and a plurality of secondary apertures formed therein. A unitary airflow diffuser has a plurality of spurs radially extending from a perimeter of a central aperture formed in the airflow diffuser, wherein the airflow diffuser is secured to the mounting plate such that the primary central aperture formed in the mounting plate and the central aperture formed in the air diffuser are substantially coaxial.

In yet another aspect, the present invention relates to a forced-air space heater including a housing and a combustion chamber disposed within the housing. The combustion chamber has an input port and a discharge port. A mounting plate has a primary central aperture and a plurality of secondary apertures formed therein, wherein the mounting plate is secured to the input port of the combustion chamber. A unitary airflow diffuser has a plurality of spurs radially extending from a perimeter of a central aperture formed in the airflow diffuser, wherein the airflow diffuser is secured to the mounting plate such that the primary central aperture formed in the mounting plate and the central aperture formed in the air diffuser are substantially coaxial. Means is provided for delivering a supply of fuel through the apertures into the combustion chamber, as is means for drawing ambient air into the housing and directing the air toward and through the airflow diffuser, and means for igniting the fuel in the combustion chamber.

The invention in a yet further aspect pertains to a unitary airflow diffuser for use with a combustion chamber in a forced-air space heater, including a hub having an aperture for receiving a nozzle. A plurality of spurs radially extends from the hub, wherein each of the spurs includes (i) a tapered faceplate substantially coplanar with the hub, (ii) a primary vane extending from an edge of the faceplate so as to form a closed angle with a side of the faceplate, the primary vanes having an edge substantially parallel to the faceplate, and (iii) a substantially triangular secondary vane extending from an opposite edge of the faceplate so as to form a closed angle with an opposite side of the faceplate. A mounting tab extends from the substantially parallel edge of each of a plurality of the primary vanes, each of the mounting tabs being substantially parallel to the hub for securing the airflow diffuser to an input port of the combustion chamber. An igniter bracket extends from the hub, the igniter bracket having an aperture for receiving an igniter. A sensor bracket extends from at least one of the secondary vanes, the sensor bracket having an aperture for receiving a sensor, and a deflector tab extends at an angle from at least one of the primary vanes toward the aperture in the hub.

In a still further aspect, the present invention relates to a unitary airflow diffuser for use with a combustion chamber in a forced-air space heater, including nozzle receptor means for receiving a nozzle. A plurality of radially disposed primary deflector means is provided for redirecting airflow past the airflow diffuser, and mounting means is provided for securing the airflow diffuser to an input port of the combustion chamber.

In another aspect of the present invention, a forced-air space heater includes a housing, a combustion chamber disposed within the housing and having an input port and a discharge port, and a mounting plate disposed at the input port. Unitary airflow diffuser means is provided for redirecting airflow within the housing. The airflow diffuser means is secured to the mounting plate, and has a central aperture and a plurality of radially disposed primary deflector means for deflecting airflow. Means is provided for delivering a supply of fuel through the central aperture into the combustion chamber, as well as for drawing ambient air into the housing and directing the air toward and through the airflow diffuser. Further means is provided for igniting the fuel in the combustion chamber.

According to yet another aspect, the present invention relates to a unitary airflow diffuser for use with a combustion chamber in a forced-air space heater, including nozzle receptor means for receiving a nozzle. A plurality of radially disposed primary deflector means is provided for redirecting airflow past the airflow diffuser. Disposed upstream of the primary deflector means is secondary deflector means for redirecting airflow past the airflow diffuser. Mounting means is provided for securing the airflow diffuser to an input port of the combustion chamber. Igniter receptor means is for receiving an igniter, and sensor receptor means is for receiving a sensor. Tertiary deflector means is provided for redirecting airflow past the airflow diffuser and extends from at least one of the primary deflection means.

These and other objectives and aspects of the present invention will become apparent with reference to the drawings, the detailed description of the preferred embodiment, and the appended claims.

BRIEF DESCRIPTION OF THE DRAWINGS

The invention will be described in conjunction with illustrative preferred embodiments shown in the accompanying drawings, in which.

DETAILED DESCRIPTION OF THE PREFERRED EMBODIMENTS

Figure 1:
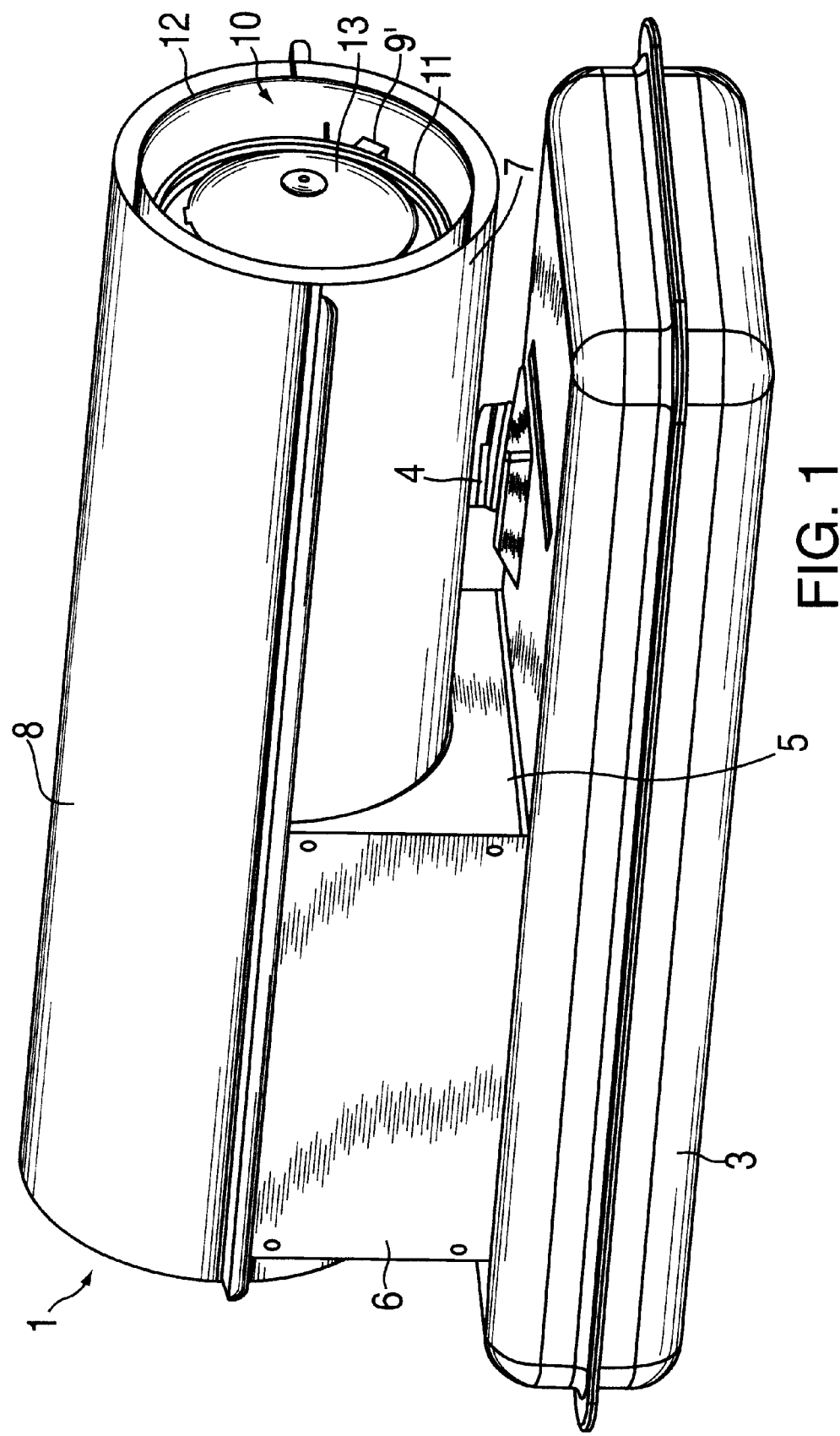
FIG. 1 is a side isometric view of a portable, forced-air, space heater according to the present invention.
Figure 2:
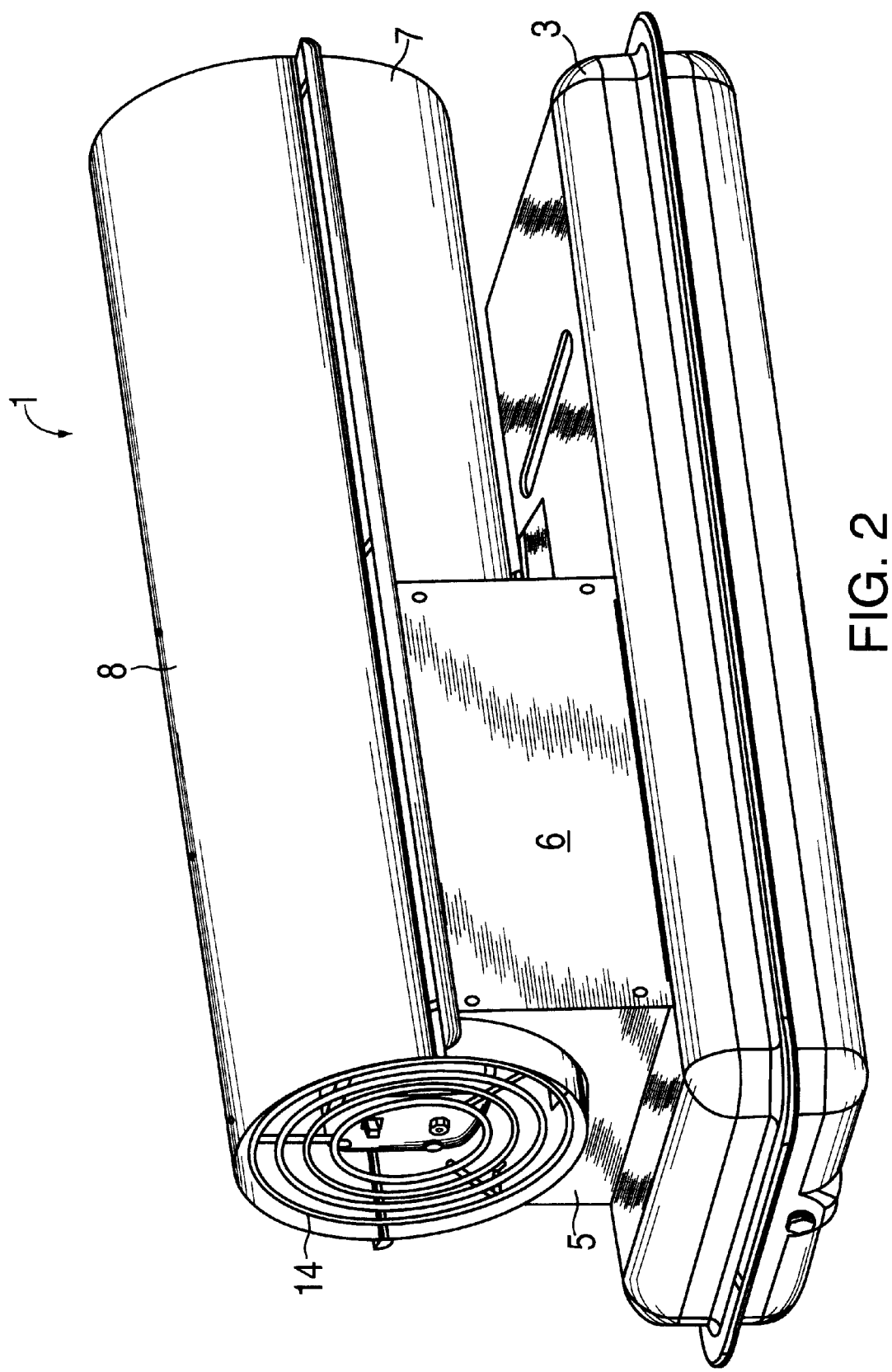
FIG. 2 is a same side, opposite end isometric view of the portable, forced-air, space heater shown in FIG. 1.

FIGS. 1 and 2 show different isometric views of a portable, forced-air, space heater 1, which generally includes a fuel tank 3, a base 5, a lower housing 7, an upper housing 8, a combustion chamber 10 comprising inner cylinder 11 and outer cylinder 12. A cone shaped afterburner 13 is provided at a discharge port of the combustion chamber and a wire guard 14 is provided at an air intake port of the space heater 1. Such a space heater is sometimes referred to as a "turbine heater" or a "torpedo heater."

The fuel tank 3 is formed from two opposing shallow rectangular trays. The trays are superposed and joined together by seam welding flanges extending around the perimeter thereof. A filler cap 4 covers a filler tube located on a top surface of the fuel tank 3 through which fuel such as a suitable grade fuel oil, kerosene, gasoline and the like may be added.

The base 5 is secured to the top surface of the fuel tank 3 by spot welding, brazing, or the like, and supports the lower housing 7 of the heater. The base 5 includes at least one removable panel 6, which is secured to the base 5 by fasteners, such as machine screws, to form a compartment which houses components, such as a power supply, control and ignition circuitry, air and fuel hoses, and the like. The panel 6 is removable to provide convenient access to the components housed in the compartment for servicing and replacement.

The lower housing 7 and the upper housing 8 are each substantially shaped in the form of a longitudinally half-split, open-ended cylinder. The housings are of the same radius and are joined together at flanges formed in the perimeter of each housing to thereby form a complete cylinder. Generally, the upper housing 8 extends as a single unit for the entire length of lower housing 7. The combined housing need not be, of necessity, perfectly cylindrical but is generally tubular in shape.

The housings may be secured by means of fasteners, such as machine screws, clips, or the like. This arrangement allows the upper housing 8 to be easily removed from the lower housing 7 to facilitate servicing and replacement of the components contained within the housings.

Figure 3:
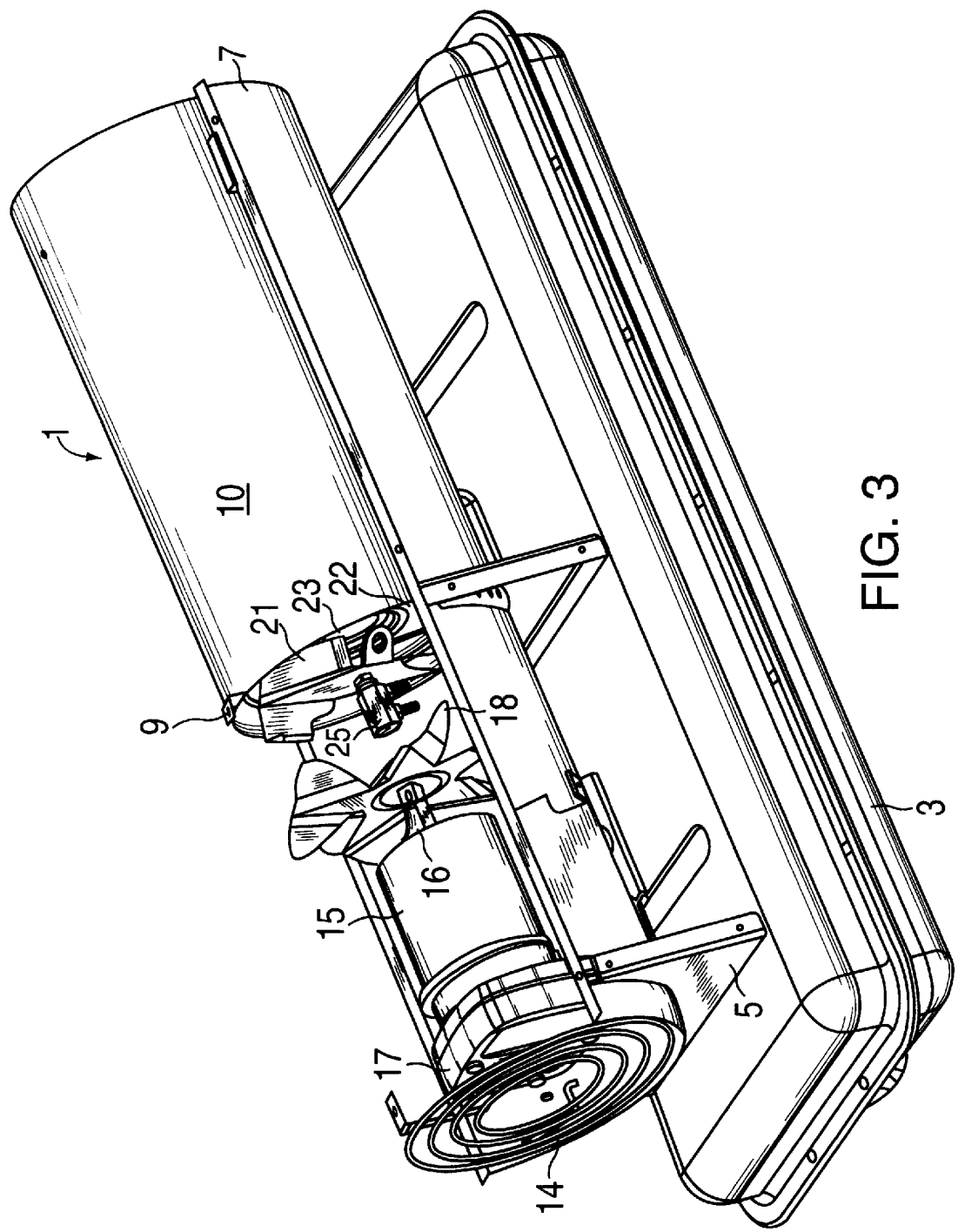
FIG. 3 is an isometric view, with a portion of the housing removed showing selected internal components of a portable, forced-air, space heater including an airflow diffuser according to a first embodiment of the invention.

In FIG. 3, the upper housing 8 has been removed to reveal selected components contained within the combined housings. The lower housing 7 supports the internal components related to the delivery of air and fuel to combustion chamber 10. More specifically, toward the intake end of the space heater 1, the lower housing 7 supports a motor 15 by means of a bracket (not visible in this view). A drive shaft 16 extends through and is rotationally driven by the motor 15. One end of the drive shaft 16 connects to an air compressor 17, which may be a carbon vane-type compressor. An opposing end of the shaft 16 connects to fan blades 18, which draw ambient air through the air intake port of the space heater. As will be discussed below, the fan blades provide secondary combustion air and also assist in keeping components of the space heater from overheating. The wire guard 14 at the intake port prevents large objects, which can damage the fan blades 18 or block the air passages, from entering therethrough, and also protects the user of the space heater.

The combustion chamber 10 is fabricated as a double-walled structure including two coaxial cylinders or shells 11, 12 with an annular space formed between the outside surface of the inner cylinder 11 and the inside surface of the outer cylinder 12. Another annular space between the outer surface of the outer cylinder 12 and the combined upper and lower housings serves to reduce the amount of heat that is transferred therebetween.

The combustion chamber is secured to the upper and lower housings at the input side by a plurality of evenly spaced brackets 9. The brackets are secured by screws or the like to the outer cylinder 12 and to a mounting plate 22 to be discussed below. Brackets 9' at the discharge port of the combustion chamber also serve to secure the outer cylinder 12 to the housings. The brackets 9' also support the afterburner 13, to be described below. The brackets 9 and 9' are configured such that one end of inner cylinder 11 "slip" fits onto the brackets.

Figure 4:
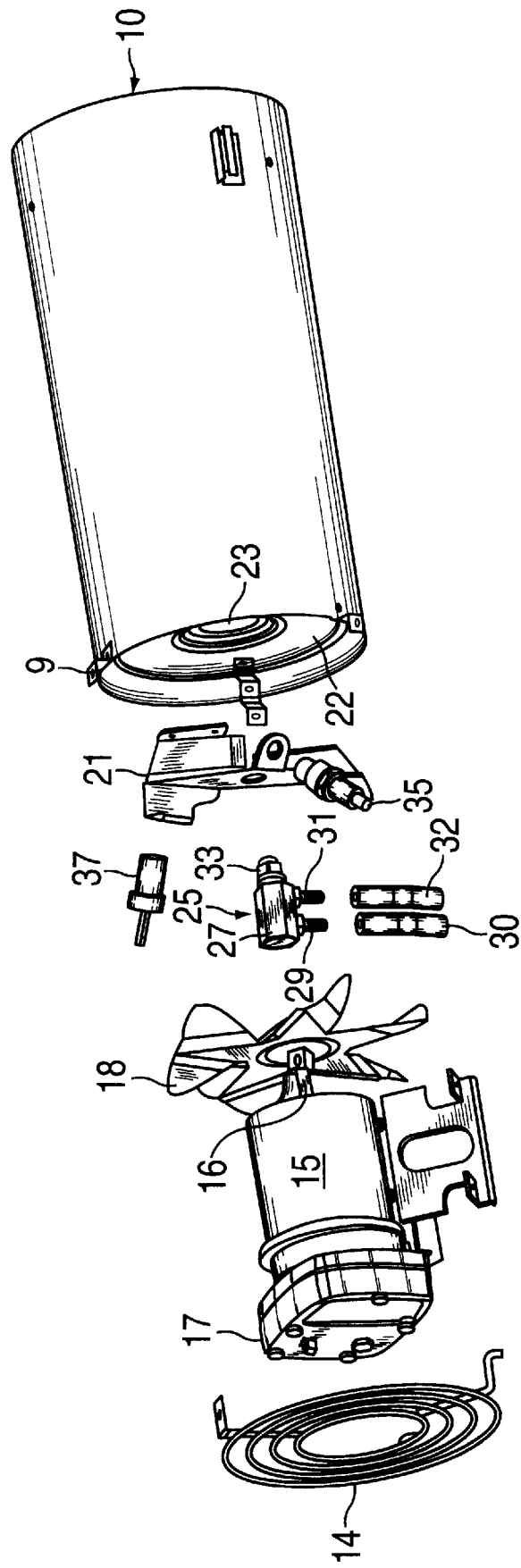
FIG. 4 is an exploded, isometric view showing selected components of a portable, forced-air, space heater, including the airflow diffuser according to the first embodiment of the invention.

With reference to FIG. 4, a unitary airflow diffuser 21, several embodiments of which will be discussed in detail below, is secured to the mounting plate 22 by means of rivets or the like. However, welding, brazing, or the like are acceptable means to secure the unitary airflow diffuser 21 to the mounting plate 22. The airflow diffuser 21 supports a nozzle assembly 25, an igniter 35, and a flame detecting sensor 37.

As noted above, the mounting plate 22 is secured to the interior surface of cylinder 12 at the input port of the combustion chamber 10 by means of brackets 13 using screws or the like. The mounting plate 22 is disposed substantially perpendicular to the longitudinal axis of combustion chamber 10. A central aperture 23 is formed in the mounting plate 22 and is substantially coaxial with the cylinders 11 and 12 when the mounting plate is secured to the combustion chamber 10.

An aspirating-type nozzle assembly 25 includes a nozzle holder 27 formed from a solid metal piece that has been machined to have a plurality of faceted, flat side surfaces and a pair of opposing, flat end surfaces perpendicular to the faceted side surfaces. One of the faceted surfaces is further machined to threadably receive a pair of hose fittings 29 and 31. Hose fitting 29 connects to a hose 30 for supplying fuel from the fuel tank 3 to a chamber formed in the nozzle holder 27. Hose fitting 31 connects to another hose 32 for supplying compressed air from the compressor 17 to the chamber formed in the nozzle holder 27. A bore-hole formed in one of the flat end surfaces of the nozzle holder 27 communicates with the chamber formed in nozzle holder 27 and is tapped to threadably receive a nozzle 33, which has a matching threaded portion.

Air and fuel provided to the nozzle assembly 25 are entrained in the chamber formed in the nozzle holder 27 and forced through a small borehole in the nozzle 33 to project an entrained, atomized, vaporized air-fuel mixture into the combustion chamber 10. The nozzle 33 may include an interior rotary diffuser mechanism to promote atomization and mixing.

The nozzle assembly 25 is clamped into engagement with the airflow diffuser 21. The threaded portion of the nozzle 33 engages the threaded hole tapped in the end surface of the nozzle holder 27. The nozzle assembly 25 fits through a hole formed in the airflow diffuser 21 until the nozzle holder 27 abuts the airflow diffuser 21. A snap-ring clamps onto the nozzle assembly 25 to hold the airflow diffuser 21 between the nozzle holder 27 and the snap-ring. With the airflow diffuser 21 secured in place, the nozzle 33 projects through the aperture 23 of mounting plate 22 into the inner cylinder 11 of the combustion chamber 10. Accordingly, the air-fuel mixture is introduced into one end of the combustion chamber 10. The aperture 23 is sized so as to allow secondary combustion air drawn by the fan 18 to pass therethrough, around and past the nozzle 33.

The airflow diffuser 21 ensures that the secondary combustion air is directed so as to provide a uniform, conical flame within the combustion chamber 10. Such a flame is desirable inasmuch as it promotes complete combustion, and minimizes the production of toxic fumes, such as carbon monoxide, and undesirable, noxious unburned hydrocarbon by-products, such as aldehydes. In addition, a uniform, conical flame centered within the inner cylinder 11 of the combustion chamber 10 reduces undesirable heating of the inner cylinder 11. Further, a uniform, conical flame also minimizes the likelihood that unburned fuel particles will impinge on the inside surface of the inner cylinder 11.

Afterburner 13 serves to catch unburned fuel droplets and carbon particles, which are then combusted.

An igniter 35 may be a common spark plug with either conventional electrodes or elongated electrodes. The igniter 35 is secured to the airflow diffuser 21 by inserting a threaded base of the spark plug through one side of a hole formed in a bracket extending from the airflow diffuser 21 and is secured with a matching threaded nut on the opposite side of the hole to clamp the igniter to the airflow diffuser 21. The electrodes are positioned to be proximate to the entrained, atomized, and vaporized air-fuel mixture aspirated by the nozzle 35 into the combustion chamber 10.

A sensor 37 may be any of a number of well-known photosensors in the art, and is provided, as part of a safety mechanism, to determine the presence of a flame in the combustion chamber 10. The sensor 37 is encased in a compressible body which includes a pair of generally coaxial cylindrical housing sections with different exterior diameters. The body of sensor 37 is secured to the airflow diffuser 21 by means of an interference fit by inserting and urging the leading section into a hole provided in the airflow diffuser 21 until the trailing section abuts against a surface of the airflow diffuser.

Figure 5:
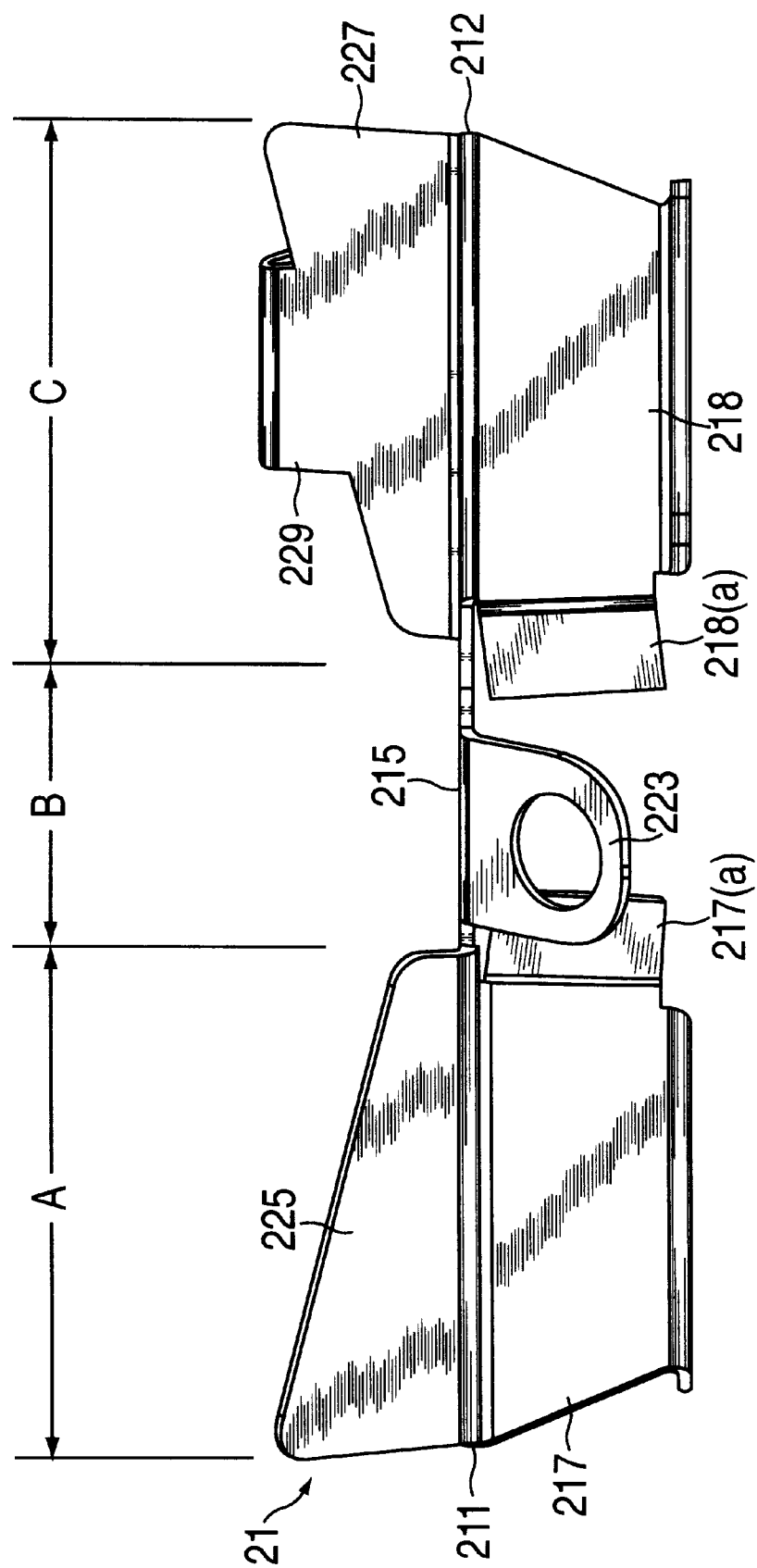
FIG. 5 is a side elevation of an airflow diffuser according to a first embodiment of the invention.
Figure 6:
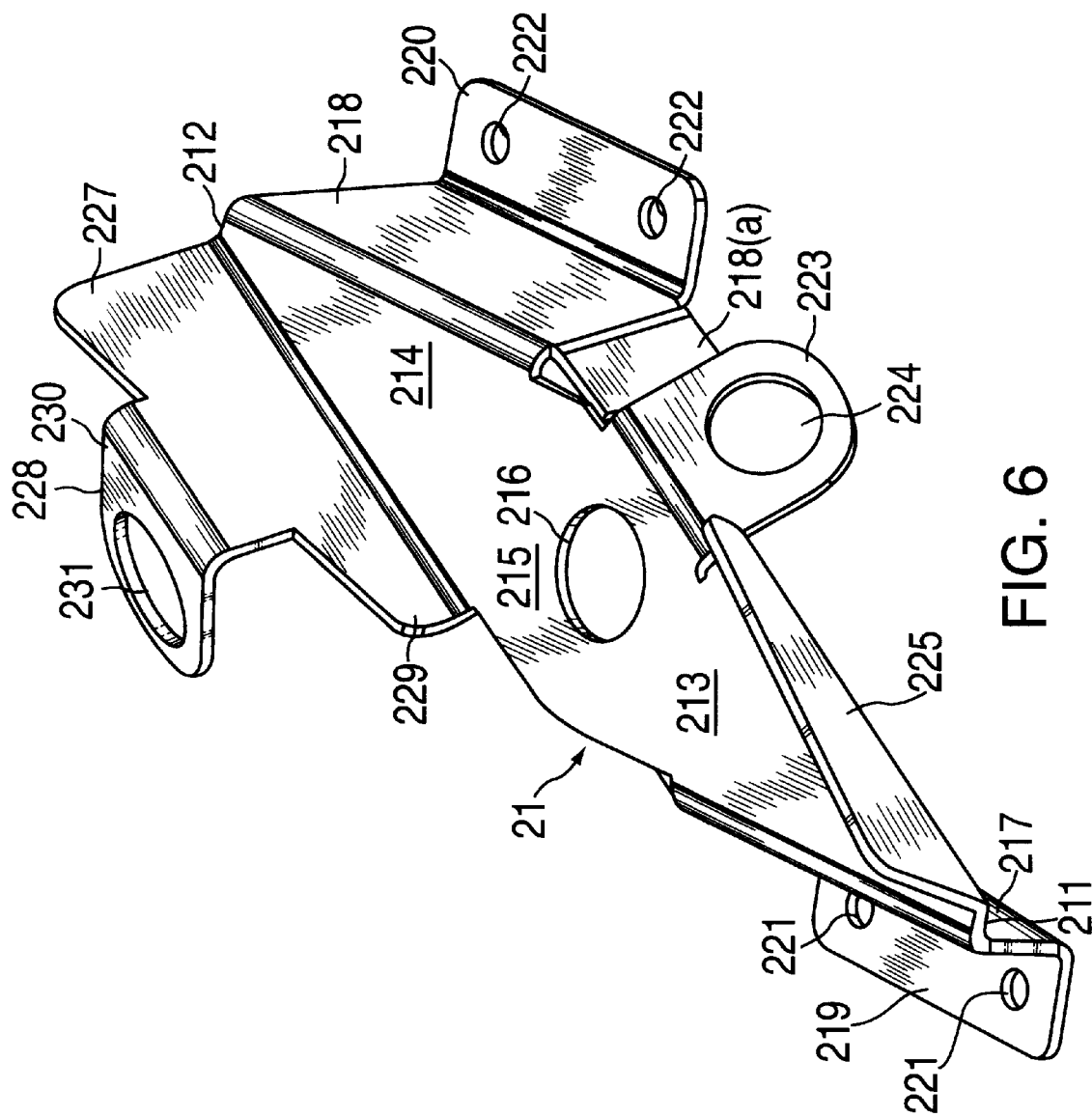
FIG. 6 is a top isometric view of the airflow diffuser shown in FIG. 5.
Figure 7:
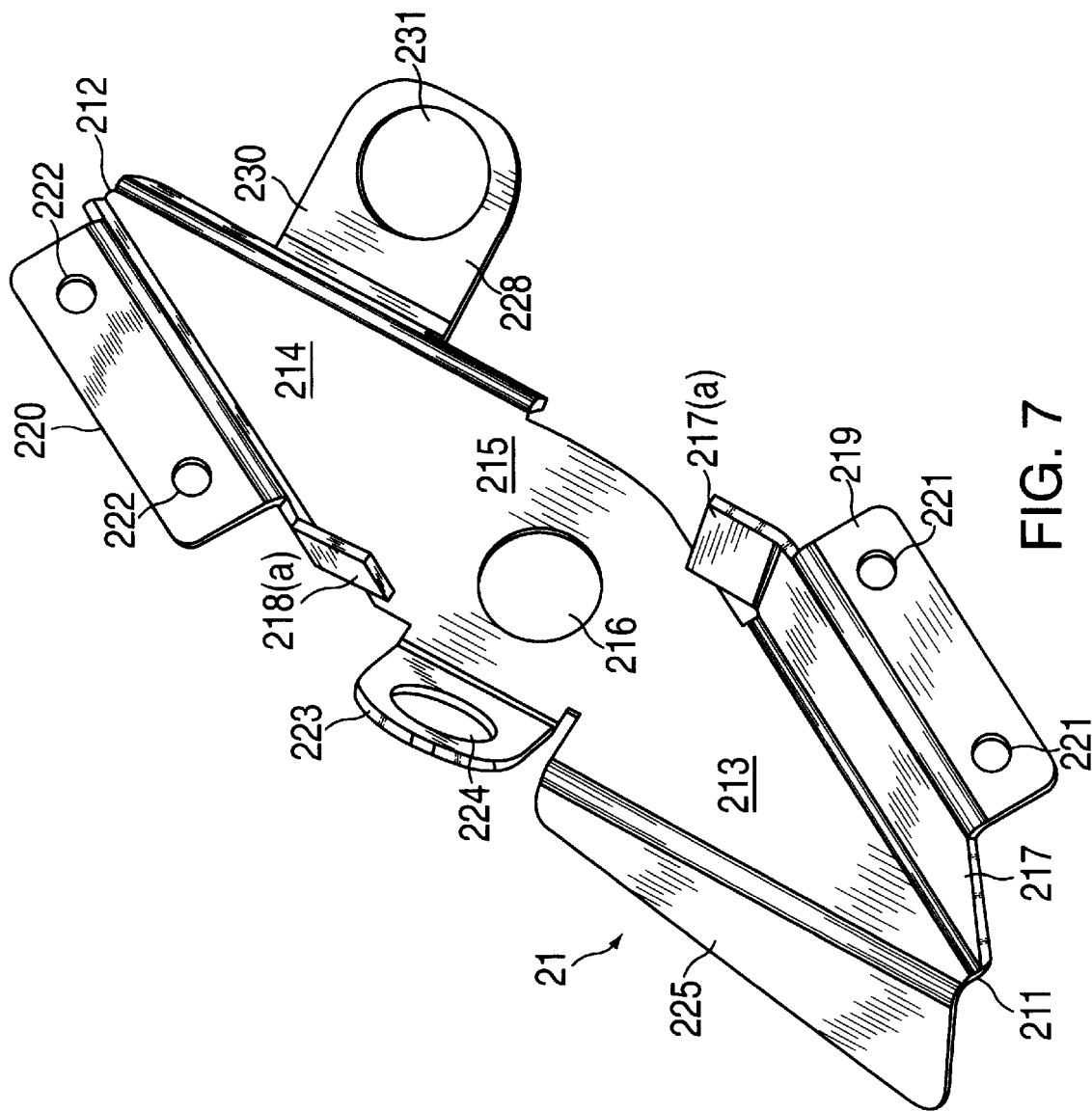
FIG. 7 is a bottom isometric view of the airflow diffuser shown in FIGS. 5 and 6.

FIGS. 5 through 7 illustrate, in detail, a unitary airflow diffuser 21 according to a first embodiment of the disclosed invention. Such airflow diffusers may be made of stamped stainless steel. Of course other materials suitable for use in connection with combustion chamber environments may be used.

In FIG. 5, a side elevational view, the airflow diffuser 21 is schematically depicted for purposes of discussion in three sections, i.e., "A", "B", and "C". Sections A and C depict a pair of spurs 211, 212 radially extending from a hub 215, depicted as Section B.

As shown generally in FIGS. 5 through 7, flat, tapered faceplate segments 213, 214 of the spurs 211, 212, respectively, and the hub 215 of the airflow diffuser 21 are contiguous and preferably, but not necessarily, lie in a substantially common plane. An aperture 216 in the form of a circular hole is formed in the hub 215 of the airflow diffuser 21 for receiving the nozzle 33. The spurs 211, 212 extend substantially in a radial direction from a center of the aperture 216, so as to be diametrically opposed to each other.

A pair of substantially trapezoidally shaped primary airflow deflection vanes 217, 218 extend from opposite edges of the faceplates 213, 214 respectively. The vanes 217, 218 form closed (i.e., between 0° and 180°) angles, preferably approximately right or slightly obtuse angles, with the faceplates 213, 214, respectively. Deflector tabs 217(a), 218(a) of the vanes 217, 218, respectively, angle toward the aperture 216 to further deflect the airflow in the vicinity of the nozzle 33 in order to optimize the air-fuel mixture.

A pair of mounting tabs 219, 220 extend from the distal edges of vanes 217, 218, respectively. The mounting tabs 219, 220 are angled with respect to the vanes 217, 218 so as to be substantially parallel with the faceplates 213, 214 and hub 215. While any of a number of mounting mechanisms are acceptable, preferably each of the mounting tabs 219, 220 is provided with a pair of holes 221, 222, respectively, for mounting the airflow diffuser 21 to the mounting plate 22 by means of fasteners, such as screws or the like.

An igniter holder 223 extends from the hub 215. The igniter holder 223 forms an obtuse angle, in this embodiment approximately 135°, with respect to the hub 215. A hole 224 is provided in the igniter holder 223 for receiving the igniter 35 (not shown in these figures). The dimensions of the igniter and the nozzle dictate the positional relationship between the hub 215 and the igniter holder 223 to ensure optimal positioning of the electrodes of the igniter 35 proximate to the air-fuel mixture ejected from nozzle 33.

A pair of substantially trapezoidally shaped secondary airflow deflection vanes 225, 227 extend from and form obtuse angles, in this embodiment approximately 135°, with the faceplates 213, 214, respectively. The secondary vanes 225, 227 extend from opposite surfaces of (i.e., form closed angles with opposite sides of) the faceplates 213, 214 relative to the primary vanes 217, 218, respectively.

A sensor holder 228 receives the sensor 37 (not shown in these figures) and includes a tab portion 229 extending substantially straight from the airflow vane 227 and a mounting portion 230 angled relative to the tab portion 229. An aperture 231 provided in the mounting portion 230 receives the sensor 37. Because of the angle of the mounting portion 230, when the sensor 37 is installed in the aperture 231, the sensor will have an unobstructed line-of-sight to the flame in the combustion chamber 10.

Generally, the more spurs that the airflow diffuser has, the greater amount of air that will be redirected into the combustion chamber.

Figure 8:
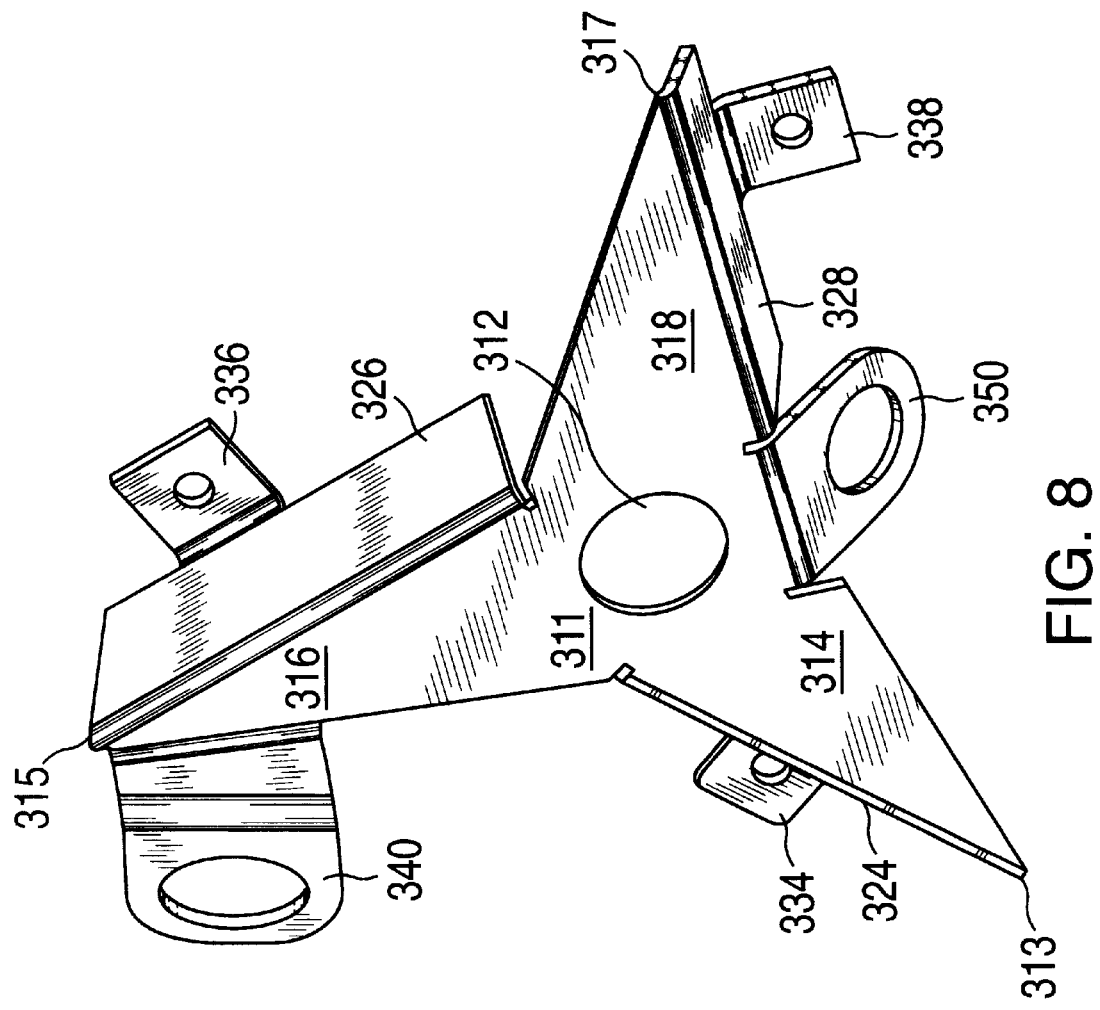
FIG. 8 is a top isometric view of an airflow diffuser according to a second embodiment of the invention.
Figure 9:
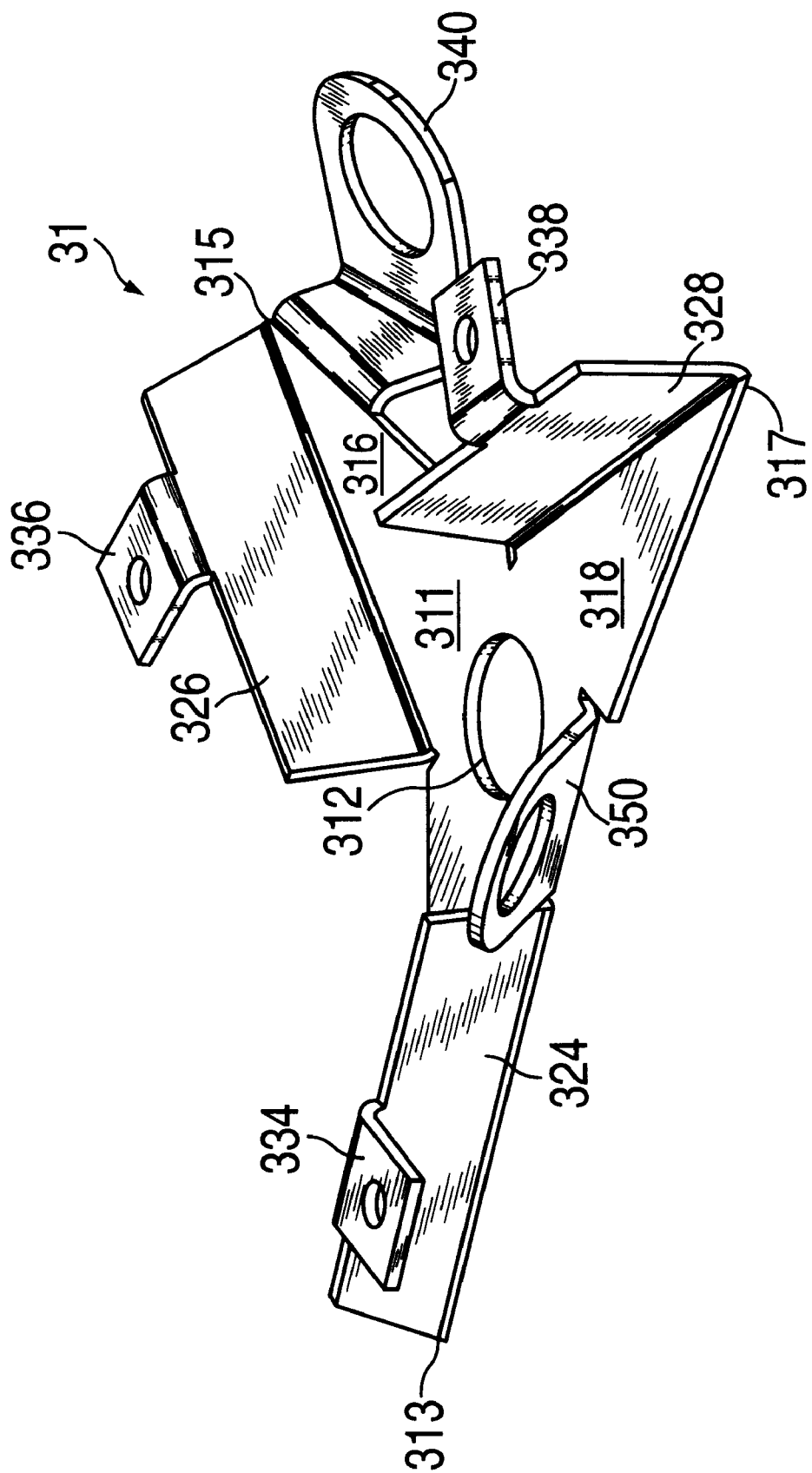
FIG. 9 is a bottom isometric view of the airflow diffuser shown in FIG. 8.

FIGS. 8 and 9 show another embodiment of an airflow diffuser 31. Three spurs 313, 315, and 317 extend radially outward from a hub 311 of the airflow diffuser 31. The spurs are arranged asymmetrically around the hub 311. Spurs 313 and 317 each are separated from spur 315 by an obtuse angle, here approximately 135°, whereas spurs 313 and 317 are separated from each other by an angle of approximately 180°. The greater angle between spurs 313 and 317 allows sufficient material and space to form and position an igniter holder 350. Positioning the igniter 35 is of greater importance for optimum performance than arranging the spurs symmetrically in a three spur airflow diffuser.

Flat tapered faceplate segments 314, 316, and 318 of the spurs 313, 315, and 317, respectively, radially extend from the hub 311. The faceplates 314, 315, and 317 and hub 311 are contiguous and preferably lie in a substantially common plane. An aperture 312 in the form of a circular hole is formed in the hub 311 of the airflow diffuser 31 for receiving the nozzle 33. The spurs 313, 315, and 317 generally extend in a radial direction from the center of the aperture 312. Three substantially rectangular primary airflow deflection vanes 324, 326, and 328 depend at an approximately right to slightly obtuse angle from one side of the faceplates 314, 316, and 318, respectively.

The primary vanes are disposed such that a vane of one spur, such as spur 315, is followed, moving clockwise, by an open edge of an adjacent spur, such as spur 317.

Mounting tabs 334, 336, and 338 extend from the vanes 324, 326, and 328, respectively, at such an angle to be substantially parallel with faceplates 314, 316, and 318. Each of the mounting tabs has a single hole formed therein for attaching the airflow diffuser 31 to the mounting plate 22 by means of screws or the like.

A sensor holder 340 is provided on spur 313 to receive the sensor 37 (not shown). The igniter holder 350 extends from the hub 311 and is disposed at the intersection between spurs 314 and 318. The sensor holder 340 and igniter holder 350 are formed, secured and function in a manner substantially similar to their counterparts discussed in connection with airflow diffuser 21.

Figure 10:
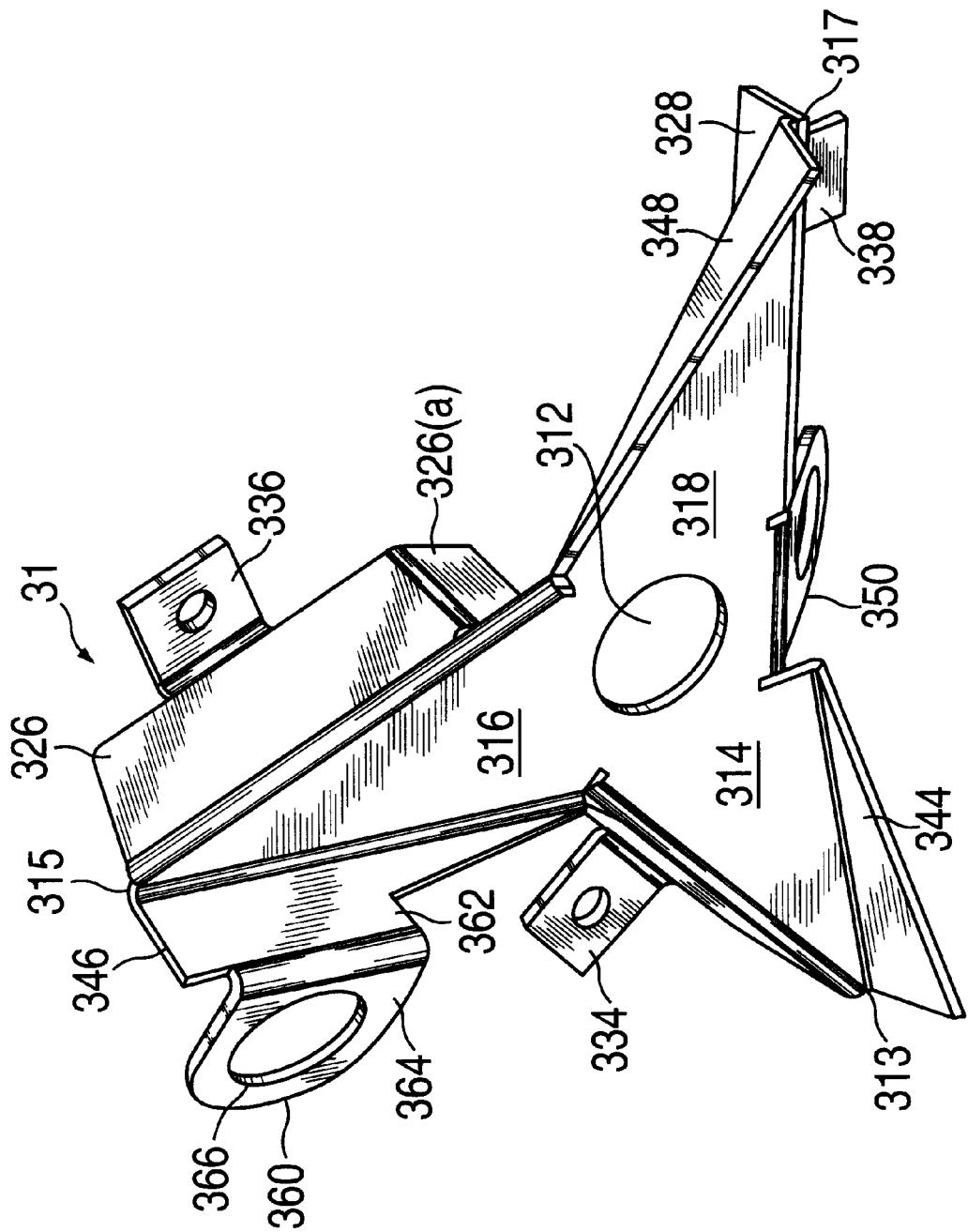
FIG. 10 is a top isometric view of an airflow diffuser according to a third embodiment of the invention.
Figure 11:
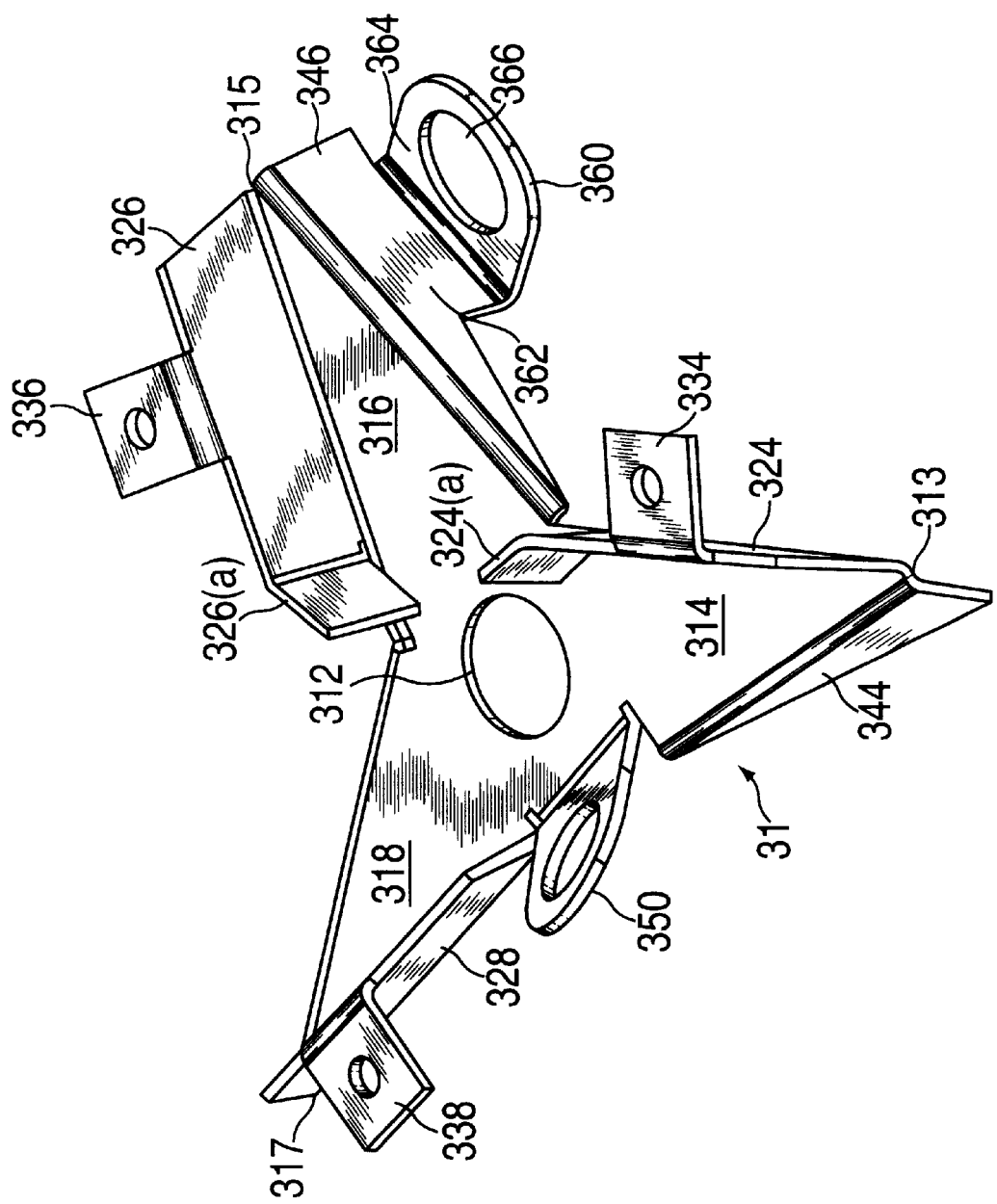
FIG. 11 is a bottom isometric view of the airflow diffuser shown in FIG. 10.

FIGS. 10 and 11 show another embodiment of an airflow diffuser 31, also featuring three spurs 313, 315, and 317 radially extending from a hub with a central aperture 312. Those components, which are substantially identical to their counterparts discussed with reference to FIGS. 8 and 9, will not be discussed again.

In FIG. 11, three additional or secondary vanes, 344, 346, and 348 extend from opposite edges of, and form closed angles with opposite sides of, the faceplates 314, 316, and 318, with respect to the primary vanes 324, 326, and 328, respectively. The secondary vanes 344, 346, and 348 are substantially triangular in shape.

Vane 346 differs somewhat from the other secondary vanes 344 and 348 in that a sensor holder 360 extends therefrom. An extension section 362 of the sensor holder 360 is substantially coplanar with vane 346 and terminates in a mounting section 364. A circular hole 366 is provided to receive the sensor 37 (not shown).

Further, primary vanes 324 and 326 feature angled deflector tabs 324(a) and 326(a), respectively, which further affect the airflow in the vicinity of nozzle 33. This feature is generally not shown in the primary vane 328 adjacent to the igniter holder 350, but may be provided.

Figure 12:
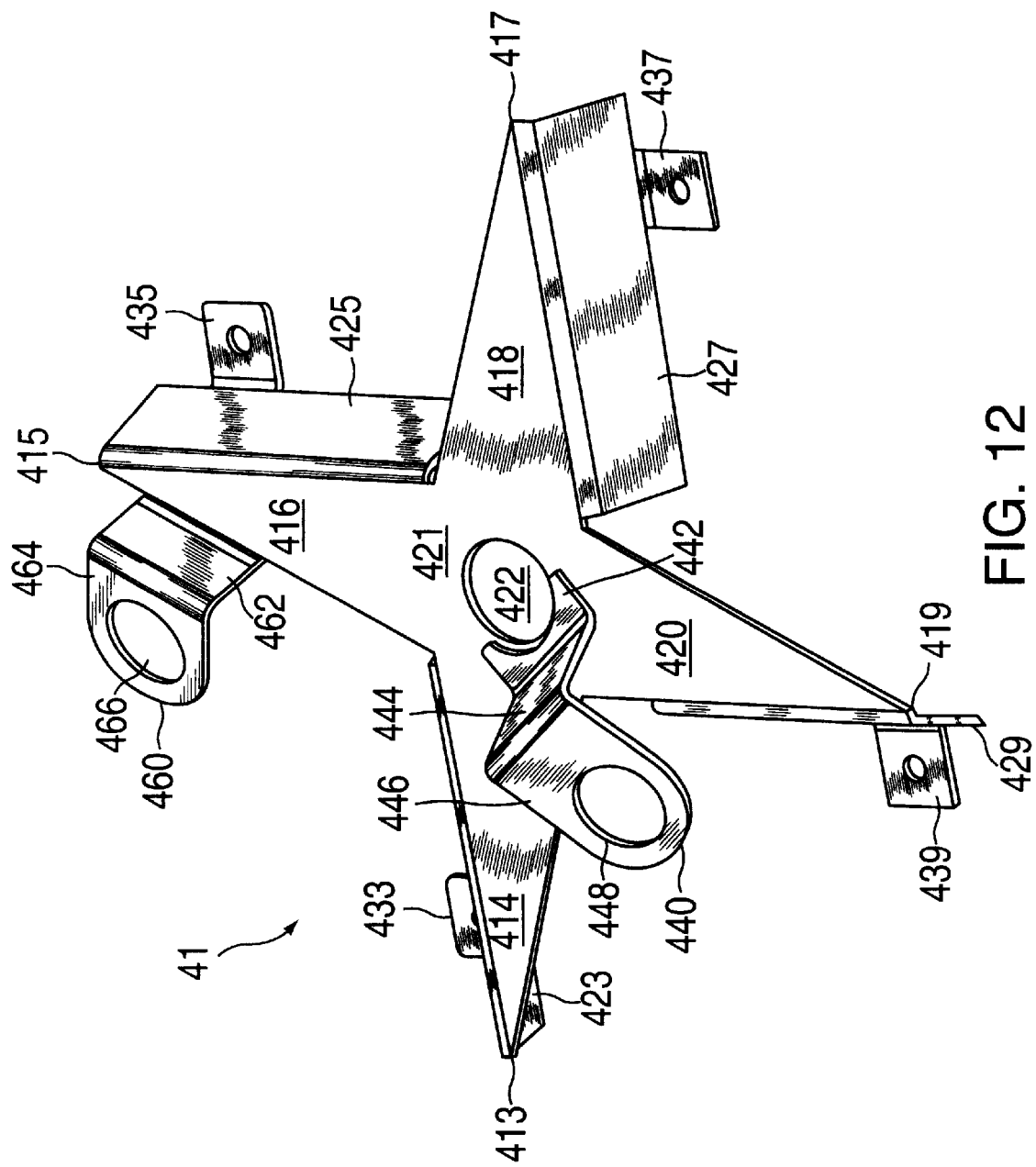
FIG. 12 is a top isometric view of an airflow diffuser according to a fourth embodiment of the invention.
Figure 13:
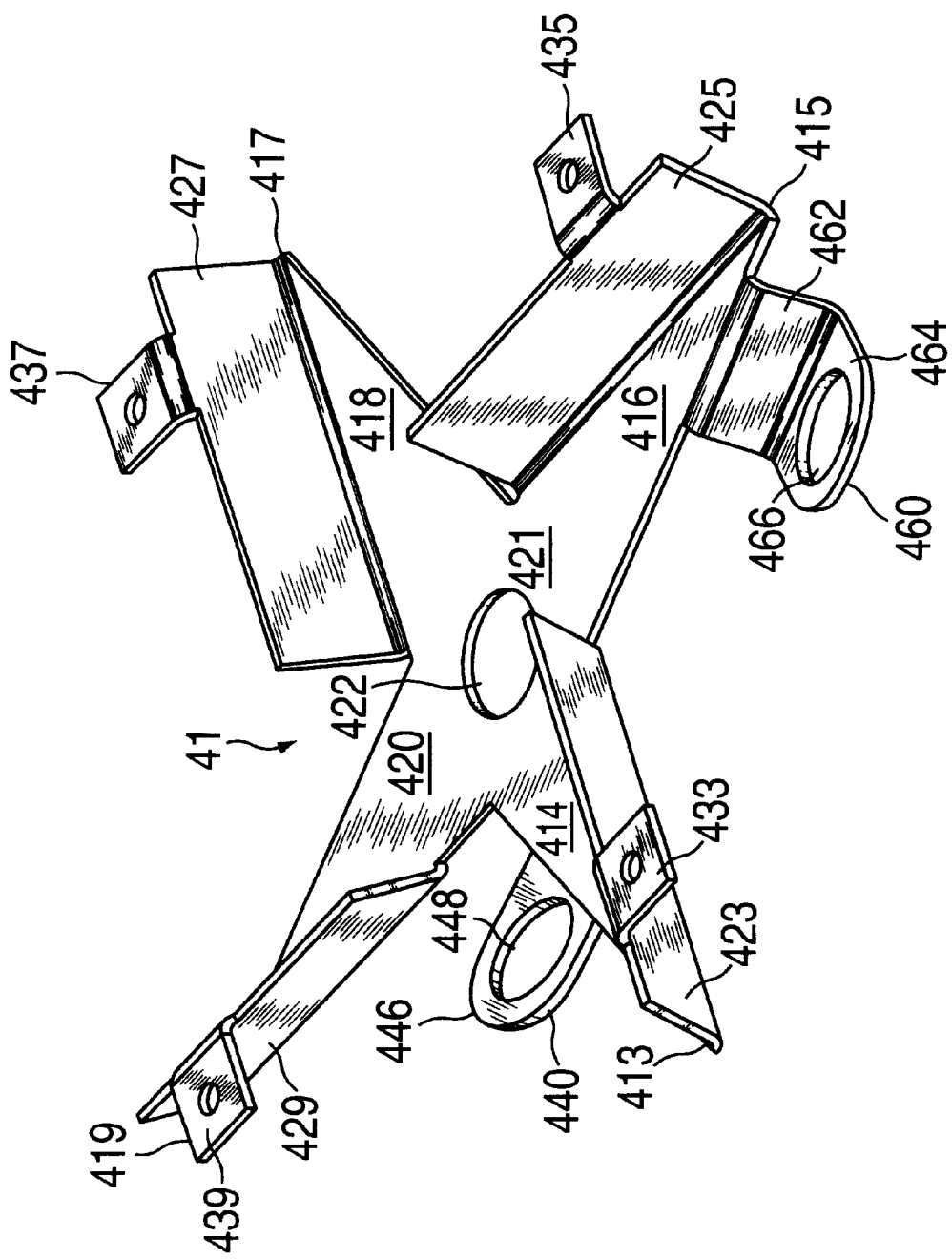
FIG. 13 is a bottom isometric view of the airflow diffuser shown in FIG. 12.

FIGS. 12 and 13 show another embodiment of an airflow diffuser. Four spurs 413, 415, 417, and 419 extend radially outward from a hub 421. The spurs are dispersed approximately evenly about the perimeter of the hub 421. An aperture 422 in the form of a circular hole is formed in the airflow diffuser 41 for receiving nozzle 33. A center of the hole defines a point from which spurs 413, 415, 417, and 419 generally extend.

Spurs 413, 415, 417, and 419 each have a flat, tapered faceplate segment 414, 416, 418, and 420, respectively extending from and preferably substantially coplanar with the hub 421. Substantially rectangular primary airflow deflector vanes 423, 425, 427, and 429 depend from an edge of the faceplates 414, 416, 418, and 420, respectively. The primary vanes are disposed such that a vane on a spur, such as spur 415, is followed, moving clockwise by an open edge of an adjacent spur, such as spur 417.

The primary vanes 423, 425, 427, and 429 form approximately right to slightly obtuse angles with the same surface of the spurs 413, 415, 417, and 419, respectively.

Mounting tabs form angles relative to the primary vanes 423, 425, 427, and 429, respectively, so as to be substantially parallel with the faceplates 414, 416, 418, and 420. Again, a single hole is provided in each mounting tab to secure the airflow diffuser to the mounting plate 22. In this embodiment, as with each embodiment, it is not necessary to provide a mounting tab on every primary vane, nor is it necessary to provide a set number of screw holes in each mounting tab, so long as the airflow diffuser is sufficiently secured to the mounting plate.

An igniter holder 440 includes a base section 442, a spacing section 444, and a mounting section 446. The base section 442 may be secured by means of spot welding to a surface of the hub 421 of the airflow diffuser 41. The igniter holder 440 is positioned generally between spurs 413 and 419. A circular hole 448 is formed in mounting section 446 for receiving the igniter 35 (not shown).

A sensor holder 460 is provided on spur 416 to receive the sensor (not shown). The sensor holder 460 functions in a manner substantially similar to its counterparts in the previous embodiments.

Figure 14:
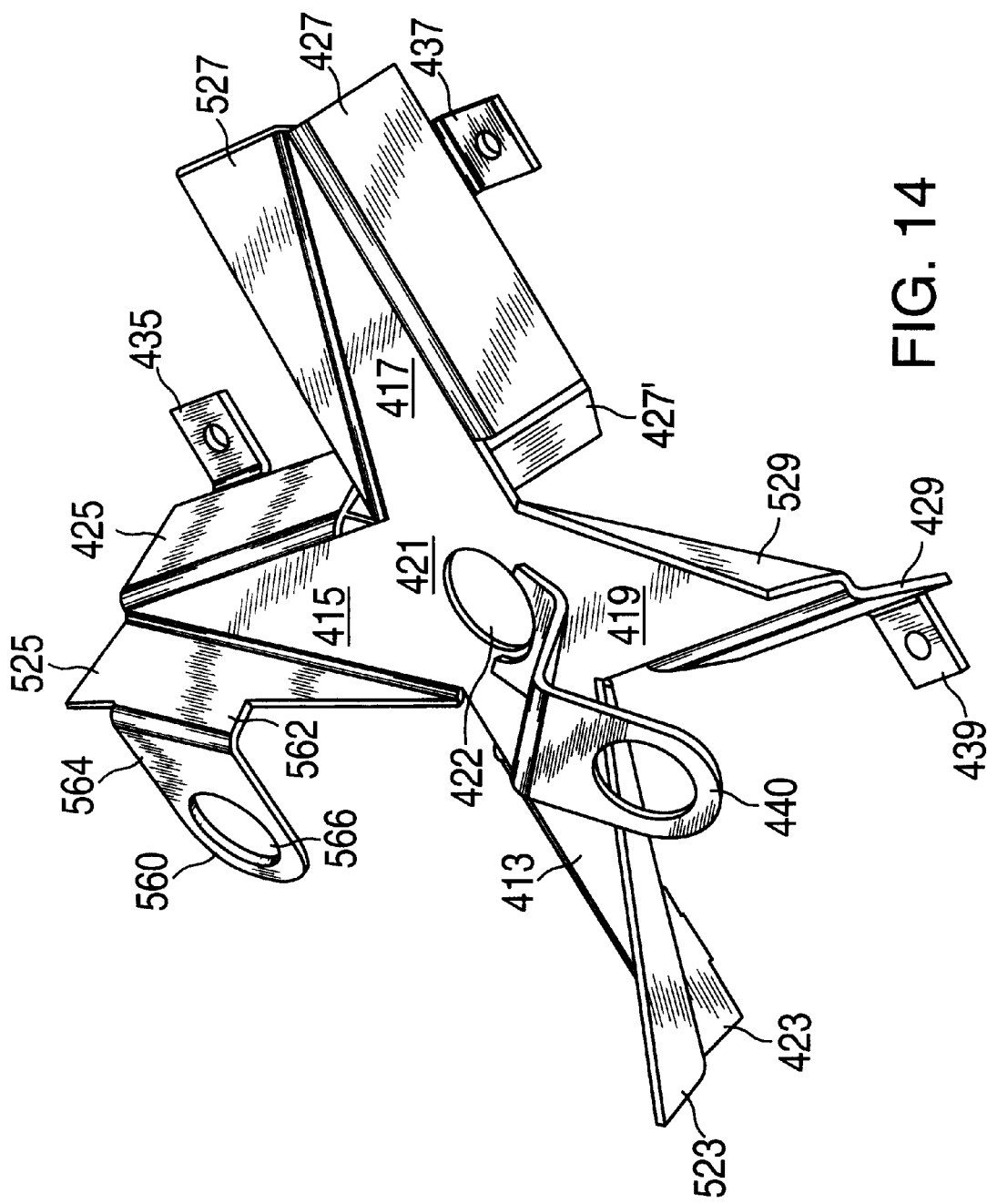
FIG. 14 is a top isometric view of an airflow diffuser according to a fifth embodiment of the invention.
Figure 15:
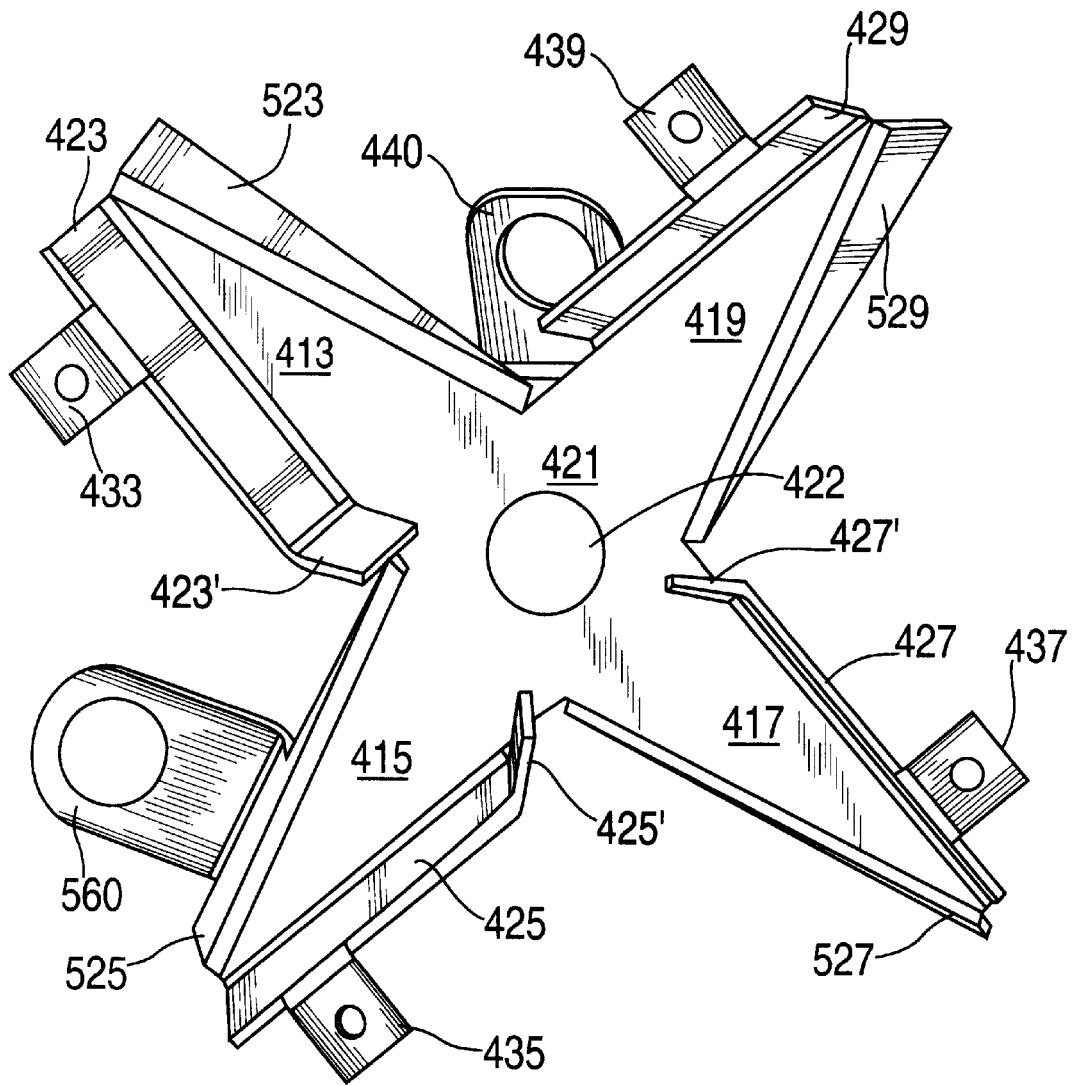
FIG. 15 is a bottom isometric view of the airflow diffuser shown in FIG. 14.

FIGS. 14 and 15 show another embodiment of an air diffuser, also featuring four spurs 413, 415, 417, and 419 radially extending from a hub 421, similar to the embodiment shown and discussed in connection with FIGS. 12 and 13. Those components of the embodiment shown in FIGS. 14 and 15, which are identical to their previously discussed counterparts shown in FIG. 12 and 13, will not be discussed again.

Four secondary vanes 523, 525, 527, and 529 extend at an approximately right to slightly obtuse angles from the spurs 413, 415, 417, and 419 in a direction opposite to (i.e., forming a closed angle with an opposite side of the faceplates of the spurs with respect to) the primary vanes 423, 425, 427, and 429, respectively. The secondary vanes 523, 525, 527 and 529 are substantially triangular in shape. Vane 525 differs somewhat from the other secondary vanes 523, 527 and 529, in that an igniter sensor 560 extends therefrom. An extension section 562 is substantially coplanar with vane 525 and terminates in a mounting section 564. A circular hole 566 is provided to receive the sensor (not shown).

Further, three of the primary vanes 423, 425 and 427 feature angled deflector tabs 423', 425' and 427', respectively, which further deflect the airflow in the vicinity of nozzle (not shown). This feature is generally not shown on the primary vane 429 adjacent to the igniter holder 440, but may be provided.

In operation, a kerosene or other fuel oil fired forced-air space heater is provided with a source of power supplied to the motor 15, which simultaneously drives the compressor 17 and the fan blades 18. As noted above, compressed air is delivered to the nozzle assembly 25 by means of the hose 32 and siphons fuel through the hose 30 from the fuel tank 3. Atomized and vaporized fuel is delivered through the nozzle 33 into the combustion chamber 10. The nozzle is mounted in an aperture in the hub of an airflow diffuser, such as the two spur airflow diffuser 21. The compressed air serves as the primary combustion air. However, the fan blades 18 draw ambient air into the space heater to provide secondary combustion air, which is directed toward the airflow diffuser. Faceplates, openings, and deflector vanes are provided on the airflow diffuser to direct the secondary air into and through the combustion chamber 10.

Figure 16:
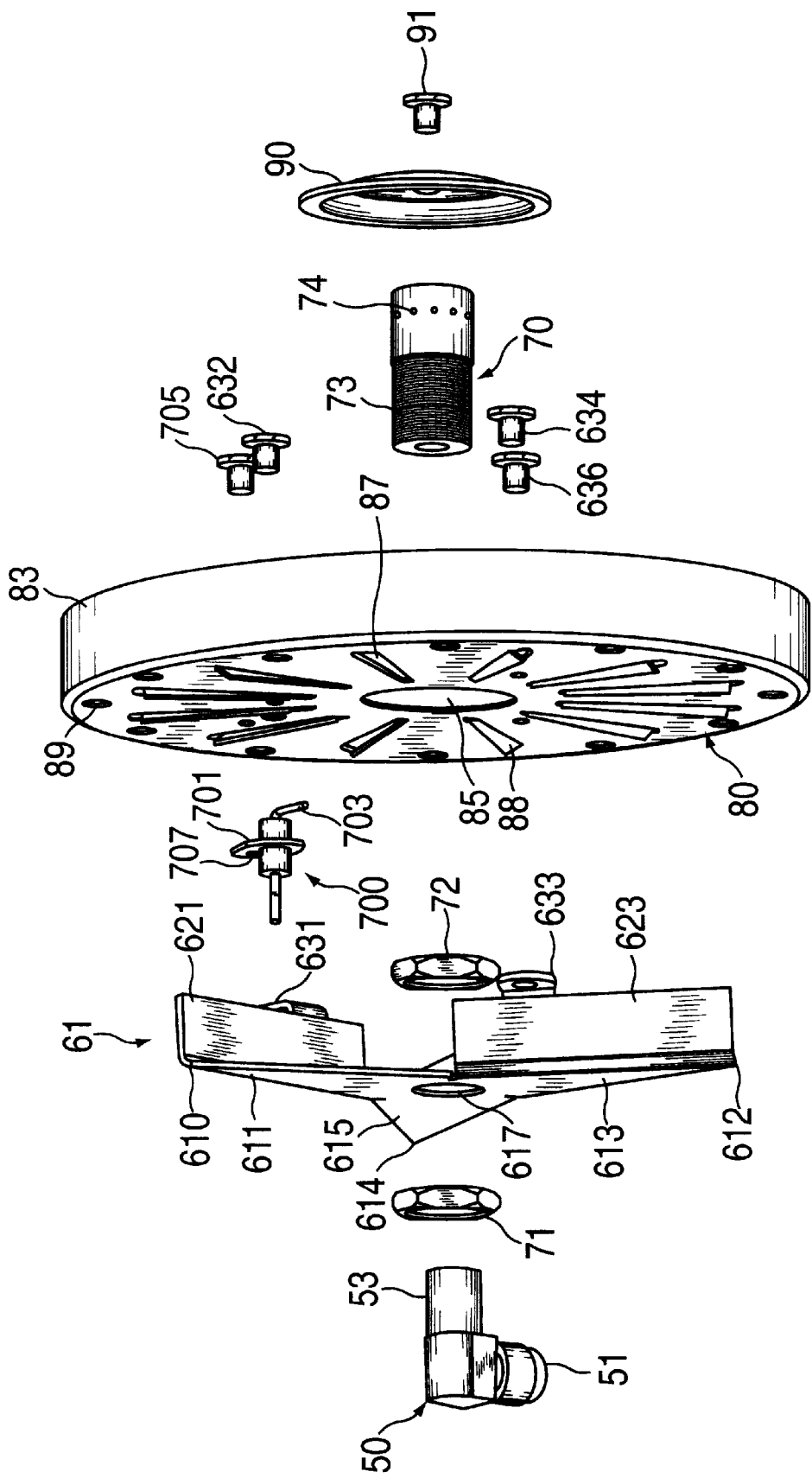
FIG. 16 is an exploded top isometric view of an airflow diffuser according to a sixth embodiment of the invention.
Figure 17:
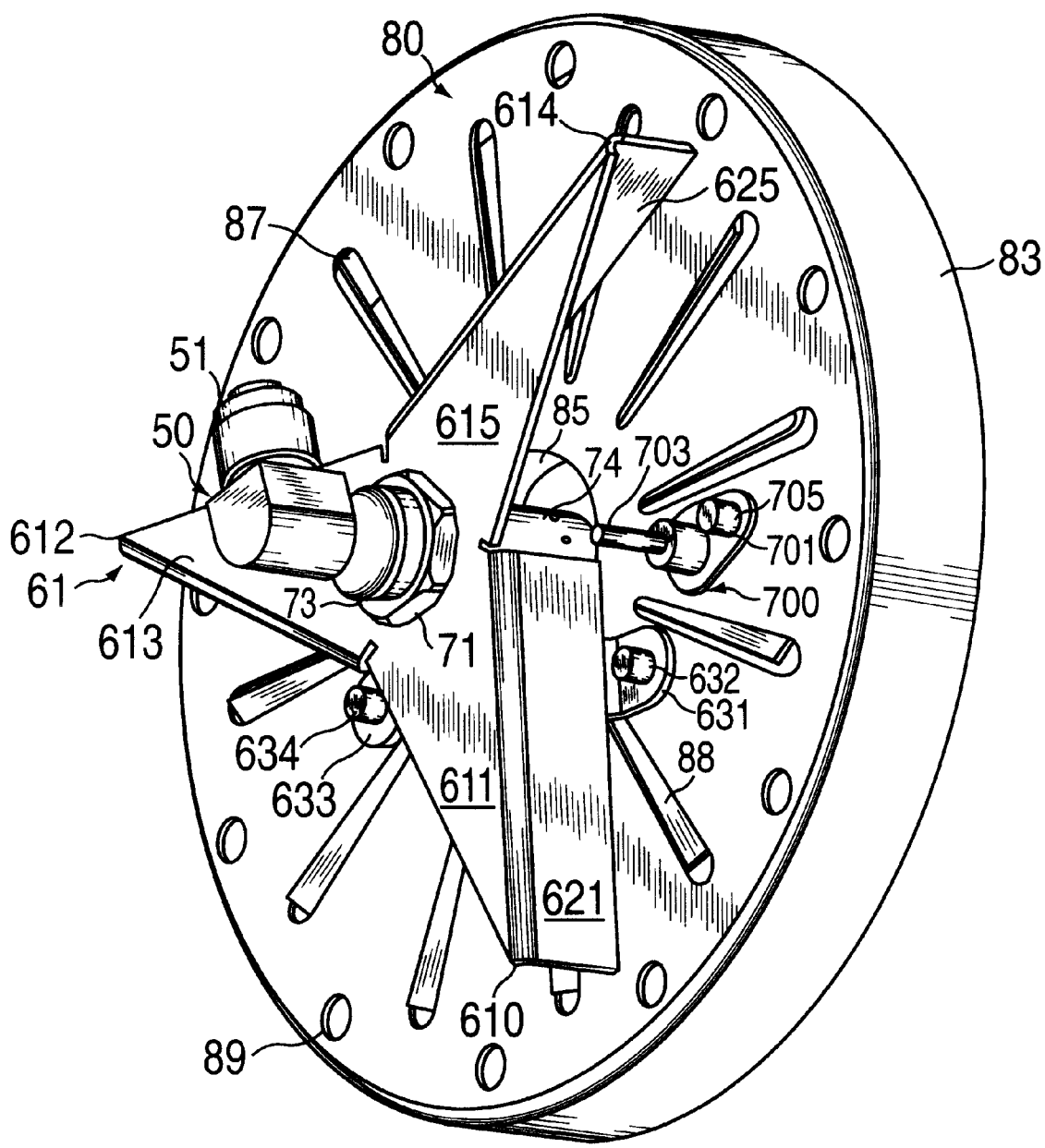
FIG. 17 is a top isometric view of the airflow diffuser shown in FIG. 16.
Figure 18:
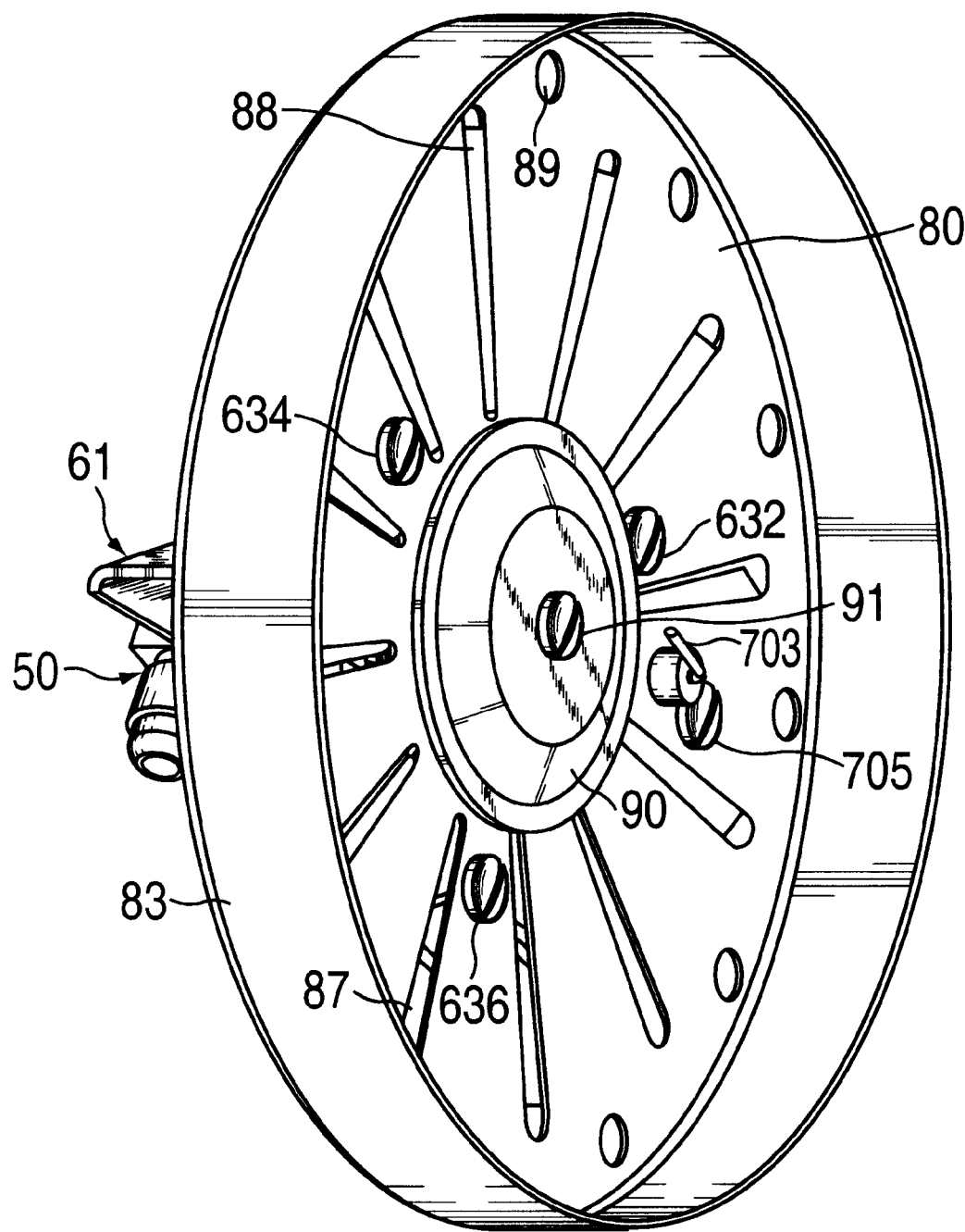
FIG. 18 is a bottom isometric view of the airflow diffuser shown in FIG. 16.

FIGS. 16 through 18 show an airflow diffuser and mounting plate suitable for use in a gas fired forced-air heater. Initially, it is noted that gas fired forced-air heaters are generally simpler than oil fired forced-air heaters inasmuch as the former do not require compressors to deliver fuel to the combustion chamber. Moreover, the igniter for a gas fired forced-air heater is simpler than that used for a oil fired forced-air heater, and therefore so is the airflow diffuser used therein. Further, gas fired forced-air space heaters do not use fuel tanks as above described but rather use well-known bottle tanks containing propane, butane and the like.

An airflow diffuser 61 is shown having three spurs 610, 612, and 614 extending radially from a common hub with a central aperture 617. Spurs 610, 612, and 614 each include a flat tapered faceplate 611, 613, and 615 from which depends a substantially perpendicular vane 621, 623, and 625, respectively. Mounting tabs 631, 633, and 635 extend from the vanes 621, 623, and 625, respectively, substantially parallel to the faceplates 611, 613, and 615.

A circular mounting plate 80 has an annular skirt 83 perpendicular to and extending around its periphery. The diameter of the mounting plate 80 is selected to provide a snug interference fit within the inner cylinder of combustion chamber (not shown). A primary circular aperture 85 is formed in center of the mounting plate 80. Uniformly spaced, elongated apertures 87 extend radially from the primary aperture 85 and are generally tear-drop shaped, i.e., tapered to be narrower nearer to the primary aperture 85. Additionally, a series of small, generally circular apertures 89 near the periphery of the mounting plate 80 are positioned generally evenly between the elongated apertures 87.

The airflow diffuser 61 is secured to the mounting plate 80 by screwing the mounting tabs 631, 633 and 635 to the mounting plate with screws 632, 634, and 636. The airflow diffuser 61 is mounted so that the central aperture 617 is coaxial with the primary aperture 85 of the mounting plate.

Each of the elongated apertures 87 may include an airflow deflector vane 88 extending at an angle from the surface of the mounting plate 80. The amount of air passing through the aperture may be regulated by varying the angle of the airflow deflector vane 88. It is also noted that the tear-drop shape of each aperture 87 allows more air to enter the aperture near the periphery of mounting plate 80, improving combustion characteristics.

A nozzle assembly 50 having a hose fitting 51 and a nozzle fitting 53 is provided to deliver gas to combustion chamber 10. The nozzle fitting 53 is pressed into a sleeve of a nozzle 70 that is inserted into the central aperture 617. The nozzle 70 has a threaded end 73. A pair of nuts 71 and 72 are threaded onto the threaded end 73 of the nozzle 70 on opposite sides of the air diffuser 61 to clamp the gas delivery components to the air diffuser.

The nozzle 70 extends a short distance away from the underside of the mounting plate 80. A flame spreader 90 is secured to the end of the nozzle 70 by means of fastener, such as a machine screw 91. The nozzle 70 includes a series of small apertures 74 for radially discharging gas between the underside of the mounting plate 80 and the flame spreader 90.

The size of the gap between the mounting plate 80 and the flame spreader 90, which can be adjusted by moving the nuts 71, 72 on the threaded end 73 of the nozzle 70, affects the fuel-air ratio near the nozzle discharge. A larger gap permits more air to flow therethrough, decreasing the fuel-air ratio. Conversely, a smaller gap increases the fuel-air ratio.

Similarly, the size of the apertures 74 affects the fuel-air ratio. Larger apertures, used in higher BTU heaters, discharge more fuel, increasing the fuel-air ratio.

An igniter assembly 700 includes a mounting bracket 701 and an igniter 703 such as a spark igniter. The igniter is secured to the mounting plate 80 by means of a fastener, such as a machine screw 105 threaded from beneath the mounting plate into a threaded hole 707 formed in the mounting bracket 701.

In the operation of the gas fired forced-air space heater, the gas is delivered under pressure to the nozzle assembly 50 and ignited by an igniter in combustion chamber 10. There is no need to supply compressed air to the nozzle assembly in such a gas fired forced-air space heater. The nozzle assembly 50 is mounted on an airflow diffuser, such as the three spur diffuser 61.

By properly designing the airflow diffuser as to the number of spurs, the number, shape and position of the central aperture, space plates, deflectors, deflector tabs, and openings, fuel is optimally combusted. Ideally, a uniform conical flame is provided in the combustion chamber 10, which reduces the amount of heat transferred to the surface of the combustion chamber and reduces the likelihood that unburned fuel particles will impinge on the surface of the combustion chamber.

In practice, the size of the apertures 74 in the nozzle 70 is determined based upon the desired BTU output of the heater. As discussed earlier, different sized apertures 74 result in the delivery of different amounts of fuel through the nozzle. This will generally dictate a corresponding increase or decrease in the amount of air that must be delivered to the combustion region. In the case of the gas fired forced-air heaters, this compensation is accomplished by changing the distance between the mounting plate 80 and the flame spreader 90 and by adjusting the vanes on the spurs 610, 612 and 614 of the diffuser 61 and near the apertures 87 in the mounting plate 80. Similar tuning can be accomplished in oil fired forced-air heaters by altering the number of spurs or the vane configuration on the diffuser. Once the optimal configuration is determined for a particular type and size of heater, then the nozzle, diffuser and mounting plate can be mass-produced with the appropriate characteristics.

While the present invention has been disclosed with respect to what is presently considered to be the preferred embodiments for purposes of illustration, it is to be understood that many of the details disclosed herein can be varied considerably by those skilled in the art, and the invention is not limited to the preferred embodiments. To the contrary, the invention is intended to cover various modifications and equivalent structures, arrangements, and functions included within the spirit and scope of the appended claims. For example, in each of the preferred embodiments, the faceplates of the spurs are substantially coplanar with the hub. However, the faceplates may be slightly angled or twisted relative to the hub without departing from the scope of the invention. The scope of the following claims is to be accorded the broadest interpretation so as to encompass all such modifications and equivalent structures, arrangements, and functions.

I claim:

1. A unitary airflow diffuser for use with a combustion chamber in a forced-air space heater, comprising:
   a hub having an aperture for receiving a nozzle;
   a plurality of spurs radially extending from said hub, wherein each of said spurs includes a tapered faceplate and a primary vane extending from an edge of said faceplate so as to form a closed angle with a side of said faceplate; and
   a mounting tab extending from each of a plurality of said primary vanes, each of said mounting tabs being substantially parallel to said hub for securing said airflow diffuser to an input port of the combustion chamber.

2. The unitary airflow diffuser according to claim 1, further comprising an igniter bracket extending from said hub, said igniter bracket having an aperture for receiving an igniter.

3. The unitary airflow diffuser according to claim 1, wherein each of said primary vanes has an edge substantially parallel to said faceplate.

4. The unitary airflow diffuser according to claim 1, wherein said faceplates of said spurs are substantially coplanar with said hub.

5. The unitary airflow diffuser according to claim 1, wherein at least one of said spurs further includes a secondary vane extending from an opposite edge of said faceplate so as to form a closed angle with an opposite side of said faceplate.

6. The unitary airflow diffuser according to claim 5, further comprising a sensor bracket extending from at least one of said secondary vanes, said sensor bracket having an aperture for receiving a sensor.

7. The unitary airflow diffuser according to claim 5, further comprising a deflector tab extending at an angle from at least one of said primary vanes toward the aperture in said hub.

8. The unitary airflow diffuser according to claim 5, wherein each of said secondary vanes is substantially triangular in shape.

9. A forced-air space heater comprising:
   a housing;
   a combustion chamber disposed within said housing, said combustion chamber having an input port and a discharge port;
   a mounting plate disposed at said input port;
   a unitary airflow diffuser secured to said mounting plate, said airflow diffuser having a hub, with a central aperture, and a plurality of spurs radially extending from said hub, wherein each of said spurs includes a tapered faceplate and a primary vane extending from an edge of said faceplate so as to form a closed angle with a side of said faceplate;
   means for delivering a supply of fuel through the central aperture into said combustion chamber;
   means for drawing ambient air into said housing and directing the air toward and through said airflow diffuser; and
   means for igniting the fuel in said combustion chamber.

10. The forced-air space heater according to claim 9, further comprising an igniter bracket extending from said hub, said igniter bracket having an aperture for receiving an igniter.

11. The forced-air space heater according to claim 9, wherein each of said primary vanes has an edge substantially parallel to said faceplate.

12. The forced-air space heater according to claim 9, wherein said faceplates of said spurs are substantially coplanar with said hub.

13. The forced-air space heater according to claim 9, wherein at least one of said spurs further includes a secondary vane extending from an opposite edge of said faceplate so as to form a closed angle with an opposite side of said faceplate.

14. The forced-air space heater according to claim 13, further comprising a sensor bracket extending from at least one of said secondary vanes, said sensor bracket having an aperture for receiving a sensor.

15. The forced-air space heater according to claim 13, further comprising a deflector tab extending at an angle from at least one of said primary vanes toward the aperture in said hub.

16. The forced-air space heater according to claim 13, wherein each of said secondary vanes is substantially triangular in shape.

17. The forced-air space heater according to claim 9, wherein said means for delivering a supply of fuel comprises a nozzle assembly, a compressor, and a fuel supply hose, wherein compressed air is provided to said nozzle assembly to syphon fuel through said fuel supply hose, and wherein said nozzle assembly is clamped to said airflow diffuser around the central aperture.

18. The forced-air space heater according to claim 17, wherein said fuel is one of heating oil, kerosene, and gasoline.

19. The forced-air space heater according to claim 9, wherein said means for delivering a supply of fuel comprises a nozzle assembly and a fuel supply hose wherein fuel is provided to said nozzle assembly, and wherein said nozzle assembly is clamped to said airflow diffuser around the central aperture.

20. The forced-air space heater according to claim 19, wherein said fuel is one of propane and butane.

21. The forced-air space heater according to claim 9, wherein said means for drawing ambient air and directing said air comprises a fan.

22. The forced-air space heater according to claim 9, wherein said means for igniting the fuel comprises a spark plug.

23. The forced-air space heater according to claim 9, wherein said means for igniting the fuel is a spark igniter.

24. A forced-air space heater comprising:
   a housing;
   a combustion chamber disposed within said housing, said combustion chamber having an input port and a discharge port;
   a mounting plate having a primary central aperture and a plurality of secondary apertures formed therein for directing air, wherein said mounting plate is secured to the input port of said combustion chamber;
   a unitary airflow diffuser having a plurality of spurs radially extending from a perimeter of a central aperture formed in said airflow diffuser, wherein said airflow diffuser is secured to said mounting plate such that the primary central aperture formed in said mounting plate and the central aperture formed in said air diffuser are substantially coaxial;
   means for delivering a supply of fuel through said primary central aperture and said central aperture into said combustion chamber;

means for drawing ambient air into said housing and directing the air toward and through said airflow diffuser; and means for igniting the fuel in said combustion chamber.

25. The forced-air space heater according to claim 24, wherein the plurality of secondary apertures comprises a series of elongated slots radially extending around said primary central aperture.

26. The forced-air space heater according to claim 25, further comprising at least one airflow deflector vane extending at an angle from said mounting plate, each said deflector vane being adjacent to a different one of said elongated slots.

27. The forced-air space heater according to claim 25, wherein said elongated slots are tear-drop shaped.

28. The forced-air space heater according to claim 25, wherein the plurality of secondary apertures further comprises a series of circular apertures circumferentially disposed around the primary central aperture.

29. The forced-air space heater according to claim 28, wherein each of the circular apertures is positioned equidistantly from a pair of the elongated slots.

30. A unitary airflow diffuser for use with a combustion chamber in a forced-air space heater, comprising:

a hub having an aperture for receiving a nozzle;

a plurality of spurs radially extending from said hub, wherein each of said spurs includes (i) a tapered faceplate substantially coplanar with said hub, (ii) a primary vane extending from an edge of said faceplate so as to form a closed angle with a side of said faceplate, said primary vanes having an edge substantially parallel to said faceplate, and (iii) a substantially triangular secondary vane extending from an opposite edge of said faceplate so as to form a closed angle with an opposite side of said faceplate;

a mounting tab extending from the substantially parallel edge of each of a plurality of said primary vanes, each of said mounting tabs being substantially parallel to said hub for securing said airflow diffuser to an input port of the combustion chamber;

an igniter bracket extending from said hub, said igniter bracket having an aperture for receiving an igniter;

a sensor bracket extending from at least one of said secondary vanes, said sensor bracket having an aperture for receiving a sensor; and a deflector tab extending at an angle from at least one of said primary vanes toward the aperture in said hub.

31. A unitary airflow diffuser for use with a combustion chamber in a forced-air space heater, comprising:

nozzle receptor means for receiving a nozzle;

a plurality of radially disposed primary deflector means for redirecting airflow around said airflow diffuser; and mounting means for securing said airflow diffuser to an input port of the combustion chamber;

wherein upstream of said primary deflector means, the airflow diffuser further comprises secondary deflector means for redirecting airflow past said airflow diffuser.

32. The unitary airflow diffuser according to claim 31, further comprising, extending at an angle from at least one of said primary deflector means toward said nozzle receptor means, tertiary deflector means for redirecting airflow past said airflow diffuser.

33. A forced-air space heater comprising:

a housing;

a combustion chamber disposed within said housing, said combustion chamber having an input port and a discharge port;

a mounting plate disposed at said input port;

unitary airflow diffuser means for redirecting airflow within said housing, said airflow diffuser means being secured to said mounting plate, said airflow diffuser means having a central aperture, and including a plurality of radially disposed primary defector means for deflecting airflow;

means for delivering a supply of fuel through the central aperture into said combustion chamber;

means for drawing ambient air into said housing and directing the air toward and through said airflow diffuser; and means for igniting the fuel in said combustion chamber;

wherein said unitary airflow diffuser means further includes, upstream of said primary deflector means, secondary deflector means for deflecting airflow.

34. The forced-air space heater according to claim 33, wherein said unitary airflow diffuser means further includes, extending at an angle from at least one of said primary deflector means toward the central aperture, tertiary deflector means for deflecting airflow.

35. A unitary airflow diffuser for use with a combustion chamber in a forced-air space heater, comprising:

nozzle receptor means for receiving a nozzle;

a plurality of radially disposed primary deflector means for redirecting airflow past said airflow diffuser, and, disposed upstream of said primary deflector means, secondary deflector means for redirecting airflow past said airflow diffuser;

mounting means for securing said airflow diffuser to an input port of the combustion chamber;

igniter receptor means for receiving an igniter;

sensor receptor means for receiving a sensor; and tertiary deflector means for redirecting airflow past said airflow diffuser, said tertiary deflector means extending from at least one of said primary deflection means.

* * * * *